United States Patent
Arensdorf et al.

(10) Patent No.: US 12,540,319 B2
(45) Date of Patent: Feb. 3, 2026

(54) SIMULTANEOUS, SEQUENCING-BASED ANALYSIS OF PROTEINS, NUCLEOSOMES, AND CELL-FREE NUCLEIC ACIDS FROM A SINGLE BIOLOGICAL SAMPLE

(71) Applicant: CLEARNOTE HEALTH, INC., San Diego, CA (US)

(72) Inventors: Patrick A. Arensdorf, San Diego, CA (US); Damek Spacek, Palo Alto, CA (US); Samuel Levy, San Francisco, CA (US)

(73) Assignee: CLEARNOTE HEALTH, INC., San Diego, CA (US)

( * ) Notice: Subject to any disclaimer, the term of this patent is extended or adjusted under 35 U.S.C. 154(b) by 1239 days.

(21) Appl. No.: 17/282,694

(22) PCT Filed: Oct. 3, 2019

(86) PCT No.: PCT/US2019/054582
§ 371 (c)(1),
(2) Date: Apr. 2, 2021

(87) PCT Pub. No.: WO2020/072829
PCT Pub. Date: Apr. 9, 2020

(65) Prior Publication Data
US 2021/0380971 A1    Dec. 9, 2021

Related U.S. Application Data

(60) Provisional application No. 62/741,473, filed on Oct. 4, 2018.

(51) Int. Cl.
*C12Q 1/6806*   (2018.01)
*C12N 15/10*    (2006.01)

(52) U.S. Cl.
CPC ....... *C12N 15/1065* (2013.01); *C12Q 1/6806* (2013.01)

(58) Field of Classification Search
CPC ............ C12Q 1/6806; C12Q 2525/179; C12Q 2525/191; C12Q 2537/159;
(Continued)

(56) References Cited

U.S. PATENT DOCUMENTS 8,268,564 B2   9/2012   Roth et al.
9,551,032 B2   1/2017   Landegren et al.
(Continued)

FOREIGN PATENT DOCUMENTS

WO   WO-2017075265 A1 *   5/2017   ......... G01N 33/6845
WO   2018031897 A1        2/2018
WO   2018041062 A1        3/2018

OTHER PUBLICATIONS

Masunaga et. al. Highly sensitive detection of ESR1 mutations in cell-free DNA from patients with metastatic breast cancer using molecular barcode sequencing. Breast Cancer Res Treat 167, 49-58 (2018) (Year: 2018).*

(Continued)

*Primary Examiner* — Joseph G. Dauner
(74) *Attorney, Agent, or Firm* — Dianne E. Reed; VLP Law Group LLP

(57) ABSTRACT

The invention provides a method for the analysis of a biological sample to determine multiple types of information therefrom in a streamlined, combined workflow, where all information is obtained in a sequencing-based analysis. The information includes the presence and concentration of specific plasma proteins in a blood sample: the number, location, and types of histone modifications associated with cell-free DNA obtained from the same sample: the sequence of cfRNA and cfDNA in the cell-free DNA sample; and
(Continued)

epigenetic information pertaining to the cell-free DNA, such as hydroxy methylation and methylation profiles, i.e., the distribution of 5-hydroxymethylcytosine (5hmC) and 5-methylcy tosine (5mC) residues, respectively. The invention additionally pertains to a classical sequencing-based method for analyzing a biological sample to determine one or more non-classical sequence features of the sample. Compositions, kits, and related methods are also provided, including an embodiment in which truncated sequencing adapters are used in conjunction with barcoded PCR primers.

18 Claims, 11 Drawing Sheets

Specification includes a Sequence Listing.

(58) Field of Classification Search
CPC ........ C12Q 2537/164; C12Q 2563/179; C12Q 2565/531; C12Q 1/6804; C12Q 2561/125
See application file for complete search history.

(56) References Cited

U.S. PATENT DOCUMENTS

| | | | |
|---|---|---|---|
| 10,428,381 B2 | 10/2019 | Booth et al. | |
| 11,634,748 B2 | 4/2023 | Arensdorf et al. | |
| 2007/0020640 A1 | 1/2007 | McCloskey et al. | |
| 2016/0281134 A1 | 9/2016 | Wu | |
| 2017/0003296 A1 | 1/2017 | Eccleston | |
| 2017/0145509 A1 | 5/2017 | Koh et al. | |
| 2017/0198285 A1 | 7/2017 | Betts et al. | |
| 2018/0002738 A1 | 1/2018 | Wang et al. | |
| 2018/0010192 A1 | 1/2018 | Zhang et al. | |
| 2018/0080021 A1 | 3/2018 | Reuter et al. | |
| 2020/0010892 A1 | 1/2020 | Jin et al. | |

OTHER PUBLICATIONS

McAnena et al. Cancers (Basel). 2017. 9(1):5. (Year: 2017).*
Lundberg et al. Nucleic Acids Research. 2011. 39(15):e102. (Year: 2011).*
Casbon, et al., "A method for counting PCR template molecules with application to next-generation sequencing," Nucleic Acids Research, 2011, vol. 39, No. 12, 8 pags Apr. 13, 2011.
Cheng, et al., "Memorial Sloan Kettering-Integrated Mutation Profiling of Actionable Cancer Targets (MSK-IMPACT)" The Journal of Molecular Diagnostics, vol. 17, No. 3, pp. 252-264, May 2015.
Takara Bio USA, Inc. "A SMARTer approach to small RNA sequencing" https://www.takarabio.com/learning-centers/next-generation-sequencing/technical-notes/full-length-small-rna-libraries, 6 pages Aug. 16, 2018.
Fredriksson et al., "Protein detection using proximity-dependent DNA ligation assays," Nat Biotech, vol. 20, May 2002, 5 pages.
Gong, et al., "Multiplex real-time PCR assay combined with rolling circle amplification (MPRP) using universal primers for non-invasive detection of tumor-related mutations," RSC Adv., 2018, 8, 27375-27381.
Kirkizlar, et al., "Detection of Clonal and Subclonal Copy-Number Variants in Cell-Free DNA from Patients with Breast Cancer Using a Massively Multiplexed PCR Methodology" Translational Oncology, vol. 8 No. 5 Oct. 2015 pp. 407-416.
Koh, et al., "Noninvasive in vivo monitoring of tissue-specific global gene expression in humans," PNAS Early Edition, www.pnas.org/cgi/content/short/1405528111, 16 pages.
Lee, et al., "Chromatin architecture underpinning transcription elongation," Nucleus, 2016, vol. 7, No. 4, 352-359.
Liu, et al., "Glucosylation Mediate Rolling Circle Amplification Combined with a qPCR Assay for the Detecting of 5-Hydroxymethylcytosine," Analytical Sciences, Sep. 2016, vol. 32, pp. 963-968.
Pan, et al., "Simultaneously Monitoring Immune Response and Microbial Infections during Pregnancy through Plasma cfRNA Sequencing" Clinical Chemistry 63:11, 1695-1704 (2017).
Snyder, et al., "Cell-free DNA comprises an in vivo nucleosome footprint that informs its tissues-of-origin" Cell. Jan. 14, 2016; 164(0): 57-68. doi:10.1016/j.cell.2015.11.050, 24 pages.
So., et al., "A robust targeted sequencing approach for low input and variable quality DNA from clinical samples," npj Genomic Medicine (2018) 3:2 ; doi: 10.1038/s41525-017-0041-4, 10 pages.
Stahlberg, et al., "Simple, multiplexed, PCR-based barcoding of DNA enables sensitive mutation detection in liquid biopsies using sequencing," Nucleic Acids Research, 2016, vol. 44, No. 11 e105, Apr. 7, 2016, 7 pages.
"PCT Search Report and Written Opinion, PCT/US2019/054582", Jul. 7, 2020, 22 pages.
Xing "Theoretical Analysis and Prediction of Nucleosome Positioning based on Sequence Information," Chinese Doctoral Dissertations Full-text Database, Basic Sciences, Sep. 15, 2014, 98 pages.
Cleo M Salisbury et al., "Activity-based probes for proteomic profiling of histone deacetylase," Proc Natl Acad Sci USA, Jan. 23, 2007, vol. 104, No. 4, pp. 1171-1176.

* cited by examiner (index = GTCGGTAA)

(indexRC = ATTGCGTG)

SEQUENCE LISTING

<160> NUMBER OF SEQ ID NOS: 18

<210> SEQ ID NO 1
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 1
cgtttccgtt cttcttcgtc                                                 20

```
<210> SEQ ID NO 2
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 2
tactcgcacc gaaaatgtca                                                    20

<210> SEQ ID NO 3
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 3
gtggcgggtt atgatgaact                                                    20

<210> SEQ ID NO 4
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 4
cataaaatgc ggggattcac                                                    20

<210> SEQ ID NO 5
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 5
tgaaaacgaa agggatacg                                                     20

<210> SEQ ID NO 6
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 6
gtccagctgg gagtcgatac                                                    20

<210> SEQ ID NO 7
<211> LENGTH: 66
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 7
caagcagaag acggcatacg agatgtcggt aagtgactgg agttcagacg tgtgctcttc        60
cgatct                                                                   66
```

```
<210> SEQ ID NO 8
<211> LENGTH: 66
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 8
caagcagaag acggcatacg agataggtca ctgtgactgg agttcagacg tgtgctcttc      60
cgatct                                                                 66

<210> SEQ ID NO 9
<211> LENGTH: 33
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 9
acactctttc cctacacgac gctcttccga tct                                   33

<210> SEQ ID NO 10
<211> LENGTH: 31
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 10
gatcggaaga gcacacgtct gaactccagt c                                     31

<210> SEQ ID NO 11
<211> LENGTH: 44
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 11
aatgatacgg cgaccaccga gatctacact ctttccctac acga                       44

<210> SEQ ID NO 12
<211> LENGTH: 24
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 12
caagcagaag acggcatacg agat                                             24

<210> SEQ ID NO 13
<211> LENGTH: 58
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 13
aatgatacgg cgaccaccga gatctacact ctttccctac acgacgctct tccgatct        58
```

```
<210> SEQ ID NO 14
<211> LENGTH: 66
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 14
caagcagaag acggcatacg agatattgcg tggtgactgg agttcagacg tgtgctcttc    60
cgatct                                                               66

<210> SEQ ID NO 15
<211> LENGTH: 57
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 15
aatgatacgg cgaccaccga gatctacact ctttccctac acgacctctt ccgatct       57

<210> SEQ ID NO 16
<211> LENGTH: 65
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 16
gatcggaaga gcacacgtct gaactccagt cacgtcggta atctcgtat gccgtcttct     60 gcttg                                                                65

<210> SEQ ID NO 17
<211> LENGTH: 56
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 17
aatgatacgg cgaccaccga gatctacact ctttccctac acgactcttc cgatct        56

<210> SEQ ID NO 18
<211> LENGTH: 66
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 18
caagcagaag acggcatacg agatattgcg tggtgactgg agttcagacg tgtgctcttc    60
cgatct                                                               66
```

SIMULTANEOUS, SEQUENCING-BASED ANALYSIS OF PROTEINS, NUCLEOSOMES, AND CELL-FREE NUCLEIC ACIDS FROM A SINGLE BIOLOGICAL SAMPLE

SEQUENCE LISTING

The instant application contains a Sequence Listing which has been submitted electronically in ASCII format and is hereby incorporated by reference in its entirety. Said ASCII copy, created on Jul. 9, 2025, is named 3599-0003US-NP_SL.txt and is 5,018 bytes in size.

TECHNICAL FIELD

The present invention relates generally to epigenetic analysis, and more particularly relates to combined workflow methods for obtaining multiple types of information from a single biological sample. The invention finds utility in the fields of genomics, medicine, diagnostics, and epigenetic research.

BACKGROUND

Obtaining a significant amount of information from a relatively small biological sample that contains minute quantities of analytes, presents unique challenges. A cell-free DNA (cfDNA) sample, for instance, typically contains only a few nanograms of DNA per mL of plasma. As a result, it is difficult to assess more than one or two features of a cell-free DNA sample, e.g., DNA sequence information and/or methylation data, often using separate workflows for each, splitting an already low amount of DNA sample as input, and limiting the amount of information that can be learned about the same starting molecule (for example, if a single starting cfDNA fragment template contained both methylated and hydroxymethylated cytokines). Nevertheless, methods have been proposed for obtaining different types of information from one cfDNA sample. See, e.g., provisional U.S. Patent Application Ser. No. 62/630,798 to Arensdorf et al., filed Feb. 14, 2018, for "Methods for the Epigenetic Analysis of DNA, Particularly Cell-Free DNA" (Bluestar Genomics, Inc.), which describes a method for detecting different epigenetic features in a single sample of cell-free DNA, including the presence and location of 5-methylcytosine (5mC) and 5-hydroxymethylcytosine (5hmC) residues in DNA fragments, wherein differentially processed DNA fragments are ultimately pooled and sequenced together to provide the desired information; and U.S. Patent Publication No. 2017/0298422 A1 to Song et al. for "Simultaneous Single-Molecule Epigenetic Imaging of DNA Methylation and Hydroxymethylation" (The Board of Trustees of the Leland Stanford Junior University), which describes binding different labels to 5mC and 5hmC in cell-free DNA followed by detection and analysis of signals generated by the labels. Also see U.S. Patent Publication No. 2018/0080021 to Reuter et al. for "Simultaneous Sequencing of RNA and DNA from the Same Sample," which pertains to a method for amplifying and sequencing both RNA and DNA from a single biological sample.

It would be extremely useful if far more information could be obtained from a single low volume biological sample, including, without limitation, information pertaining to DNA sequences, DNA epigenetic modifications, RNA sequences, nucleosome structure and positioning, histone modifications, and both nucleic acid-associated and free plasma proteins. Furthermore, it would be ideal if such a comprehensive data set could be generated from a single low volume biological sample in essentially the same manner and within the context of a combined workflow, without need for parallel processing, additional sample material, or multiple information-generating methodologies. Finally, to the extent such non-sequence information could be encoded together (e.g. within the sequence, but using the standard unmodified nucleic bases) within the same template nucleic acid, and travel together with the original parent template sequence through processing in subsequent steps, it would enhance compatibility with existing research workflows and next generation sequencing library preparation techniques. Most particularly, it would enable the use of extraction, amplification and detection techniques that otherwise might dilute or disassociate such non-sequence information from the associated sequences.

SUMMARY OF THE INVENTION

The invention is directed to the aforementioned need in the art and, in one embodiment, provides a combined workflow method for the analysis of a biological sample to determine multiple types of information therefrom without need for many independent analytical steps, a plurality of data-generating modalities, or a large quantity of sample. The types of information that may be obtained from a patient's blood sample, for instance, include the presence and concentration of specific plasma proteins; the number, location, and types of histone modifications associated with cfDNA (e.g., DNA from the cell-free fraction of a blood sample); the sequence of cfRNA and cfDNA in that fraction; and epigenetic information pertaining to the cell-free DNA, such as hydroxymethylation and methylation profiles, i.e., the distribution of 5-hydroxymethylcytosine (5hmC) and 5-methylcytosine (5mC) residues, respectively.

The invention additionally pertains to a classical sequencing-based method for analyzing a biological sample to determine one or more non-classical sequence features of the sample, where a "non-classical sequence feature" refers to a feature other than the identity and order of the four primary bases (i.e., adenine, cytosine, guanine, and thymine for DNA, and adenine, cytosine, guanine, and uracil for RNA) of a nucleic acid molecule in the sample. That is, the method comprises determination of classical nucleic acid sequence information from which the non-classical sequence feature of interest can be derived. The non-classical sequence feature may be information related to the composition of a nucleic acid, such as the distribution of modified cytosine residues, e.g., 5hmC or 5mC, or it may be unrelated to the composition of a nucleic acid and pertain instead to the presence and concentration of plasma proteins in a blood sample, histone modifications observed in a cell-free nucleosome fraction of the blood sample, and the like. The method may be implemented to determine a single non-classical sequence feature of a biological sample, more than one non-classical sequence feature of a biological sample, or a combination of classical sequence information and one or more non-classical sequence features. The analysis involves conversion of a non-classical sequence feature of interest, such as the identity of a plasma protein, the concentration of a plasma protein, the number, location and types of histone modifications, the hydroxymethylation profile of a nucleic acid (e.g., the 5hmC profile of cell-free DNA in a cell-free nucleic acid fraction of a biological sample), or the methylation profile of a nucleic acid (e.g., the 5mC profile of cell-free DNA in a cell-free nucleic acid fraction of a biological sample), into classical sequence data. The classical sequence data obtained includes at least one specific nucleic acid sequence in the range of about 4 to about 36 base pairs in length which serves as a Unique Feature Identifier (UFI) sequence, where the UFI is incorporated within a double-stranded DNA (dsDNA) molecule deriving from an analyte of interest in the biological sample. The classical sequence data may also comprise a cDNA sequence, thus providing information regarding the corresponding sequence of RNA template molecules, such as cell-free RNA in a cell-free nucleic acid fraction of a biological sample.

In a first embodiment, the invention provides an improved proximity extension assay for identifying a plurality of protein analytes in a biological sample by providing a plurality of probe pairs each comprising a first proximity probe and a second proximity probe, with each probe pair targeting a specific protein analyte, and generating a double-stranded DNA (dsDNA) segment between the probes of each probe pair in the presence of the corresponding protein analyte, wherein the improvement comprises:

(a) incorporating into the double-stranded DNA segments a protein-specific nucleic acid sequence that serves as a protein identifier barcode, thereby forming protein-barcoded dsDNA template molecules;
(b) amplifying and sequencing the protein-barcoded dsDNA template molecules; and
(c) identifying the protein analytes in the biological sample from the protein identifier barcodes observed in the sequence reads generated.

In some embodiments, each protein-specific nucleic acid sequence is contained within an adapter, and step (a) is carried out by end-ligating the adapters to the dsDNA segments.

In a related embodiment, an improved proximity extension assay is provided for identifying a plurality of protein analytes in a biological sample by providing a plurality of probe pairs each comprising a first proximity probe and a second proximity probe, with each probe pair targeting a specific protein analyte, and generating a dsDNA segment between the probes of each probe pair in the presence of the corresponding protein analyte, wherein the improvement comprises:

(a) incorporating into the double-stranded DNA segments (i) a protein specific nucleic acid sequence that serves as a protein identifier barcode, and (ii) a capture sequence comprising a 5hmC residue, thereby forming protein-barcoded dsDNA template molecules comprising the capture sequence;
(b) amplifying and sequencing the protein-barcoded dsDNA template molecules; and
(c) identifying the protein analytes in the biological sample from the protein identifier barcodes observed in the sequence reads generated.

In some embodiments, step (a) is carried out by end-ligating the dsDNA segments with adapters each comprising a protein-specific nucleic acid sequence and the capture sequence.

In practice, one or more 5hmC residues in the capture sequence can be functionalized to facilitate removal of the dsDNA template molecule from the sample, from a fraction of a sample, or from an admixture comprising a plurality of biomolecules. This is particularly useful in the context of a combined workflow analysis of a single biological sample from which multiple types of information are extracted.

In another embodiment, an improved proximity extension assay is provided for identifying a plurality of protein analytes in a biological sample by providing a plurality of probe pairs each comprising a first proximity probe and a second proximity probe, with each probe pair targeting a specific protein analyte, and generating a dsDNA segment between the probes of each probe pair in the presence of the corresponding protein analyte, wherein the improvement comprises:

(a) incorporating into the double-stranded DNA segments (i) a protein specific nucleic acid sequence that serves as a protein identifier barcode, (ii) a random nucleic acid sequence to serve as a molecular barcode, and optionally (iii) a capture sequence comprising a 5hmC residue, thereby forming protein-barcoded dsDNA template molecules optionally comprising the capture sequence;
(b) amplifying and sequencing the protein-barcoded dsDNA template molecules; and
(c) identifying the protein analytes in the biological sample from the protein identifier barcodes observed in the sequence reads generated.

In a related embodiment, the proximity extension assay further comprises, prior to step (b), combining at least one protein concentration control composition with the dsDNA template molecules. The control composition, together with the molecular barcode, enables the determination of the original concentration of at least one protein analyte in the sample by comparing the number of sequence reads indicative of a specific protein analyte with sequence reads generated by the protein concentration control composition.

In another embodiment, an improved proximity extension assay is provided for identifying a plurality of protein analytes in each of a plurality of biological samples, wherein, for each biological sample, the assay comprises providing a plurality of probe pairs each comprising a first proximity probe and a second proximity probe, with each probe pair targeting a specific protein analyte, and generating a dsDNA segment between the probes of each probe pair in the presence of the corresponding protein analyte, wherein the improvement comprises:

(a) incorporating into the double-stranded DNA segments (i) a protein specific nucleic acid sequence that serves as a protein identifier barcode, optionally (ii) a random nucleic acid sequence to serve as a molecular barcode, and optionally (iii) a capture sequence comprising a 5hmC residue, thereby forming protein-barcoded dsDNA template molecules optionally comprising the capture sequence;
(b) amplifying and sequencing the protein-barcoded dsDNA template molecules;
(c) identifying the protein analytes in the biological sample from the protein identifier barcodes observed in the sequence reads generated; and
(d) carrying out steps (a), (b), and (c) in parallel for at least 100 biological samples.

For example, steps (a), (b), and (c) can be carried out simultaneously for at least 300 biological samples, at least 500 biological samples, or at least 1500 biological samples.

In a related embodiment, the invention provides method for identifying a plurality of protein analytes in a biological sample using a DNA sequence-based technique, the method comprising:

(a) providing a plurality of probe pairs each targeting a specific protein analyte and comprising a protein-binding domain at a first terminus, a nucleic acid binding domain at an opposing second terminus, and a non-hybridizing nucleic acid region therebetween, wherein (i) the protein-binding domains of the first and second proximity probes of a probe pair are capable of simultaneously binding to different binding sites on the same protein analyte, and (ii) the nucleic acid binding domains of the probes are complementary to each other and hybridize to form a dsDNA segment when the first and second proximity probes are both bound to the protein and sufficiently proximal for hybridization to occur;

(b) incubating the biological sample or a fraction thereof with the probe pairs under conditions effective to facilitate (i) binding of the protein-binding domain of each proximity probe within a probe pair to the corresponding protein analyte and (ii) hybridization of the nucleic acid binding domains to each other to form a dsDNA segment with a 5' terminus originating with the first proximity probe and a 3' terminus originating with the second proximity probe;

(c) extending the 3' terminus of the first proximity probe along the second proximity probe by adding a polymerase and a mixture of dNTPs to generate a dsDNA segment between the probes that incorporates a protein-specific nucleic acid sequence to serve as a protein identifier barcode and a capture sequence comprising a 5hmC residue, wherein (i) the nucleic acid binding region of the first probe, the second probe, or both the first and second probes comprises the capture sequence, the protein identifier barcode, or both the capture sequence and the protein identifier barcode; (ii) the mixture of dNTPs comprises at least one 5hmC residue; and/or (iii) adapters are ligated onto the termini of the dsDNA segment following polymerase extension, wherein at least one adapter comprises the capture sequence, the protein identifier barcode, or both the capture sequence and the protein identifier barcode, thereby forming protein-barcoded dsDNA template molecules each comprising a capture sequence;

(d) amplifying and sequencing the protein-barcoded dsDNA template molecules comprising a capture sequence; and (e) identifying the protein analytes in the biological sample from the protein identifier barcodes observed in the sequence reads generated in step (b).

In one aspect of the aforementioned embodiment, the method is carried out on a fraction of the biological sample, typically on plasma obtained from a blood sample.

In an additional embodiment, a combined workflow method is provided in which protein analytes in one or more biological samples are analyzed as set forth with respect to any of the above embodiments, and a cell-free nucleic acid sample from the same biological sample is analyzed as well.

The information obtained for the cell-free nucleic acid sample, in a first embodiment of a combined workflow method provided herein, pertains to the presence or quantity of one or more histone modifications within nucleosomes in the cell-free nucleic acid sample. The histone modifications may be covalent post-translational modifications (PTMs), alterations in histone structure that impact on gene expression. Particular histone modifications of interest, in one aspect of this embodiment, are histone modification biomarkers for assessing a disease state in a subject may also include histone modification biomarkers for assessing a disease state in a subject.

In another embodiment of a combined workflow method provided herein, the information obtained for the cell-free nucleic acid sample includes at least one sequence of cfDNA in the cell-free nucleic acid sample.

In another embodiment of a combined workflow method provided herein, the information obtained for the cell-free nucleic acid sample includes at least one sequence of cfRNA in the cell-free nucleic acid sample.

In another embodiment of a combined workflow method provided herein, the information obtained for the cell-free nucleic acid sample includes epigenetic data pertaining to cfDNA hydroxymethylation.

In another embodiment of a combined workflow method provided herein, the information obtained for the cell-free nucleic acid sample includes epigenetic data pertaining to cfDNA methylation.

In a further embodiment, a combined workflow method is provided in which protein analytes in one or more biological samples are analyzed as described above, and a cell-free nucleic acid sample from the same biological sample is analyzed with respect to at least two of: histone modifications; cfDNA sequence; cfRNA sequence; cfDNA hydroxymethylation; and cfDNA methylation.

In another embodiment, the invention provides a method for preparing a cell-free nucleic acid sample to enable identification of at least one histone modification in a nucleosome contained therein using a DNA sequencing-based technique. The method comprises:

(a) providing a cell-free nucleic acid sample containing a plurality of nucleosomes each comprising a cfDNA molecule wound around a histone core;

(b) ligating adapters comprising terminal hybridizing regions to the ends of the cfDNA molecules, thereby providing a modified cell-free nucleic acid sample comprising adapter-ligated cfDNA molecules each wound around a histone core;

(c) providing a proximity probe comprising, at a first terminus, a histone modification binding domain that specifically binds to a histone modification of interest; at a second terminus, a nucleic acid binding domain complementary to a terminal hybridizing region; and a non-hybridizing region therebetween comprising a nucleic acid sequence that corresponds to the histone modification of interest and thereby serves as a histone modification barcode, wherein the proximity probe is dimensioned to allow for simultaneous binding of the histone modification binding domain to the histone modification of interest and hybridization of the complementary nucleic acid binding domain with the hybridizing nucleic acid region;

(d) incubating the modified cell-free nucleic acid sample with the proximity probe under conditions effective to facilitate (i) binding of the histone modification binding domain to the histone modification and (ii) hybridization of the complementary nucleic acid binding domain with the hybridizing nucleic acid region to form a dsDNA segment with a 5' terminus originating with the cell-free DNA and a 3' terminus originating with the proximity probe and comprising the histone modification barcode; and (e) extending the 5' terminus of the dsDNA segment along the non-hybridizing region of the proximity probe and the histone modification barcode by adding a polymerase and a mixture of dNTPs, thereby providing a histone modification-barcoded dsDNA template molecule for amplification and sequencing.

In a related embodiment, step (c) comprises providing a plurality of proximity probes each targeting a different histone modification.

In another related embodiment, the method additionally includes amplifying the histone modification-barcoded dsDNA template molecules.

In an additional related embodiment, the method also includes sequencing the amplified, histone modification-barcoded dsDNA template molecules and determining information about the type and location of histone modifications from the histone modification barcodes observed in the sequence reads generated.

Another embodiment of the invention pertains to a method for using adapters that comprise at least one 5hmC residue in the preparation of cfDNA for extraction from a cell-free nucleic acid sample. The method involves (a) ligating DNA adapters comprising capture sequences that comprise a 5hmC residue onto the ends of end-blunted DNA in the cell-free nucleic acid sample to provide adapter-ligated DNA; and (b) functionalizing the 5hmC residue with an affinity tag that allows selective removal of tagged cfDNA. The affinity tag may be a biotin moiety, such as biotin per se or, more typically, biotin that has been covalently modified to include a reactive site. The biotinylated 5hmC site(s) are then used to enable extraction from the sample by reaction with an avidin-coated or streptavidin-coated support.

In one aspect of the aforementioned embodiment, the adapters additionally include a UFI sequence, generally at least two UFI sequences, each indicating a non-sequence feature, or characteristic, of the cfDNA in the cell-free nucleic acid sequence. After amplification and sequencing, the non-sequence feature(s) of interest may be determined from the UFI sequences observed in the sequence reads.

In another embodiment, the invention provides a method for preparing cell-free DNA and cell-free RNA in a single cell-free nucleic acid sample for simultaneous, sequencing-based analysis. The method involves (a) ligating DNA adapters comprising a first adapter sequence that includes at least one UFI sequence onto the ends of end-blunted DNA in the cell-free sample to provide adapter-ligated DNA, where the at least one UFI sequence includes a source identifier barcode; (b) purifying the adapter-ligated DNA and RNA to provide a cell-free admixture of adapter-ligated DNA and RNA; (c) synthesizing a first strand of cDNA from the RNA; (d) synthesizing a second strand of cDNA complementary to the first strand to provide a cDNA duplex; and (e) covalently attaching to at least one terminus of the cDNA duplex, in the absence of a ligase, a cDNA adapter comprising a second adapter sequence that includes the source identifier barcode and an RNA indicator barcode, thereby providing adapter-bound cDNA in a cell-free admixture that also comprises the adapter-ligated DNA.

In a further embodiment of the invention, a combined workflow process is provided for extracting multiple types of data from a single, cell-free nucleic acid sample using a sequencing-based analysis, where the data includes the hydroxymethylation profile of cfDNA in the sample as well as sequence information for cfRNA. The data may also include DNA sequence information. The process comprises: (a) ligating DNA adapters comprising a first adapter sequence that includes at least one UFI sequence onto the ends of end-blunted DNA in the cell-free nucleic acid sample to provide adapter-ligated DNA, wherein the at least one UFI sequence includes a source identifier barcode; (b) synthesizing cDNA from RNA in the sample and covalently attaching a cDNA adapter comprising the source identifier barcode and an RNA indicator barcode to at least one terminus of the cDNA, thereby providing adapter-bound cDNA in a cell-free composition that also comprises the adapter-ligated DNA; (c) functionalizing 5hmC residues in the cell-free composition with an affinity tag that allows selective removal of 5hmC-containing DNA from the cell-free composition; (d) removing the 5hmC-containing DNA from the cell-free composition, with untagged DNA and adapter-bound cDNA remaining; (e) appending a 5hmC process barcode to the 5hmC-containing DNA; and (f) pooling, amplifying, and sequencing the barcoded 5hmC-containing DNA, the untagged DNA, and the adapter-bound cDNA.

In one aspect of the aforementioned embodiment, step (e) is carried out by incorporation of the 5hmC process barcode into the DNA adapters.

In a related embodiment of the invention, a combined workflow process is provided for extracting multiple types of data from a single, cell-free nucleic acid sample using a sequencing-based analysis, where the data includes the hydroxymethylation profile of cfDNA in the sample, cfRNA sequence information, and, optionally, DNA sequence information, as above, and further comprises the methylation profile of cfDNA in the sample. The process comprises: (a) ligating DNA adapters comprising a first adapter sequence that includes at least one UFI sequence onto the ends of end-blunted DNA in the cell-free nucleic acid sample to provide adapter-ligated DNA, wherein the at least one UFI sequence includes a source identifier barcode; (b) synthesizing cDNA from RNA in the sample and covalently attaching a cDNA adapter comprising the source identifier barcode and an RNA indicator barcode to at least one terminus of the cDNA, thereby providing adapter-bound cDNA in a cell-free composition that also comprises the adapter-ligated DNA; (c) functionalizing 5hmC residues in the cell-free composition with an affinity tag that allows selective removal of 5hmC-containing DNA from the cell-free composition; (d) removing the 5hmC-containing DNA from the cell-free composition, with untagged DNA and adapter-bound cDNA remaining; (e) appending a 5hmC process barcode to the 5hmC-containing DNA; (f) converting methylcytosine residues in the remaining sample to oxidized methylcytosine residues; (g) functionalizing the oxidized methylcytosine residues with a second affinity tag that allows selective removal of the functionalized species from the sample; (h) removing the tagged 5mC-containing DNA, with untagged DNA and adapter-bound cDNA remaining in the sample; (i) appending a 5mC process barcode to the tagged 5mC-containing DNA; and (j) amplifying and sequencing the tagged 5hmC-containing DNA, the tagged 5mC-containing DNA, the untagged DNA, and the adapter-bound cDNA.

In another related embodiment of the invention, a combined workflow process is provided for extracting at least two types of data from a single, cell-free nucleic acid sample using a sequencing-based analysis, where the data includes the hydroxymethylation profile of cfDNA in the sample, cfRNA sequence information, and, optionally, DNA sequence information. The process comprises: (a) ligating DNA adapters comprising a first adapter sequence that includes at least one molecular barcode comprising a source identifier barcode onto the ends of end-blunted DNA in the sample to provide adapter-ligated DNA; (b) synthesizing cDNA from RNA in the sample and covalently attaching, to at least one terminus of the cDNA, a cDNA adapter comprising a 5hmC residue, the source identifier barcode, and an RNA indicator barcode, thereby providing barcoded, adapter-bound cDNA; (c) functionalizing 5hmC residues in the sample with an affinity tag that allows selective removal of 5hmC-containing species from the cell-free sample; (d) removing the 5hmC-containing DNA and the barcoded, adapter-bound cDNA from the cell-free sample; and (e) amplifying and sequencing a pooled admixture of the 5hmC-containing DNA and the barcoded-adapter-bound cDNA to provide data on DNA hydroxymethylation and on cfRNA in the same sample.

In an additional related embodiment of the invention, a combined workflow process is provided for extracting at least two types of data from a single, cell-free nucleic acid sample using a sequencing-based analysis, where the data includes the presence or quantity of one or more histone modifications within nucleosomes in the cell-free nucleic acid sample, and sequence information for cfRNA in the sample. The process comprises: A combined workflow process for extracting multiple types of data from a single, cell-free nucleic acid sample, comprising: (a) ligating an adapter comprising a hybridizing nucleic acid region to each terminus of nucleosome-associated DNA, thereby providing a modified cell-free nucleic acid sample comprising nucleosomes associated with adapter-ligated DNA; (b) providing a proximity probe comprising a histone modification binding domain at a first terminus, a nucleic acid binding domain complementary to the hybridizing nucleic acid region at an opposing second terminus, and a non-hybridizing region therebetween comprising a nucleic acid sequence selected to correspond to a specific histone modification and thereby serve as a histone modification barcode, wherein the proximity probe is dimensioned to allow for simultaneous binding of the histone modification binding domain to the histone modification and the hybridization of the complementary nucleic acid binding domain with the hybridizing nucleic acid region; (c) incubating the modified cell-free nucleic acid sample with the proximity probe under conditions effective to facilitate (i) binding of the histone modification binding domain to the histone modification and (ii) hybridization of the complementary nucleic acid binding domain with the hybridizing nucleic acid region to form a dsDNA segment with a 5' terminus originating with the cell-free DNA and a 3' terminus originating with the proximity probe; and (d) extending the 5' terminus of the segment along the non-hybridizing region of the proximity probe and the histone modification barcode by adding a polymerase and a mixture of dNTPs, thereby providing a histone modification-barcoded dsDNA template molecule for further processing and sequencing; (e) purifying nucleic acids in the sample to provide a composition comprising histone modification-barcoded dsDNA and DNA; (f) synthesizing a first strand of cDNA from RNA in the sample; (g) synthesizing a second strand of cDNA complementary to the first strand to provide a cDNA duplex; and (h) covalently attaching to at least one terminus of the cDNA duplex, in the absence of a ligase, a cDNA adapter comprising a sequence that includes a source identifier barcode and an RNA indicator barcode, thereby providing a nucleic acid composition comprising adapter-bound cDNA and the histone modification-barcoded dsDNA template molecule. In this embodiment, the process further includes (i) amplifying and sequencing the histone modification-barcoded dsDNA template molecule and the adapter-bound cDNA, wherein the histone modification-barcoded dsDNA template molecule and the adapter-bound cDNA are normally amplified and sequence together in a pooled admixture.

In one aspect of the aforementioned embodiment, the process further includes incorporating an analysis of cfDNA in the sample to determine the hydroxymethylation profile thereof. The process comprises carrying out steps (a) through (h) of the embodiment and then: (i) functionalizing 5hmC residues in the nucleic acid composition with a first affinity tag that allows selective removal of 5hmC-containing species; (j) removing the tagged 5hmC-containing DNA from the composition, with untagged DNA and adapter-bound cDNA remaining; (k) appending a 5hmC process barcode to the tagged 5hmC-containing DNA; and (1) amplifying and sequencing the 5hmC-containing DNA, the untagged DNA (including the histone modification-barcoded dsDNA template molecules generated in step (d)), and the adapter-bound cDNA, wherein amplification and sequencing are normally carried out with a pooled admixture of the various species.

In another aspect of the embodiment, the process further includes the determination of the methylation profile of cfDNA in the sample. The process comprises carrying out steps (a) through (k) delineated above, and then (1) converting methylcytosine residues in the remaining sample to oxidized methylcytosine residues; (m) functionalizing the oxidized methylcytosine residues with a second affinity tag that allows selective removal of the functionalized species from the sample; (n) removing the tagged 5mC-containing DNA, with untagged DNA and adapter-bound cDNA remaining; (o) appending a 5mC process barcode to the tagged 5mC-containing DNA; and (p) amplifying and sequencing the tagged 5hmC-containing DNA, the tagged 5mC-containing DNA, the untagged DNA (including, as before, the histone modification-barcoded dsDNA template molecules)., and the adapter-bound cDNA, wherein amplification and sequencing are, again, typically carried out with a pooled admixture of the various species.

In a further embodiment of the invention, a combined workflow process is provided for carrying out both a plasma protein analysis on a blood sample and an analysis of a cell-free nucleic acid fraction of the blood sample. The plasma protein analysis involves the generation of a protein-barcoded dsDNA template molecule using a proximity extension assay and ultimately pooling that dsDNA template molecule with one or more of the the various DNA template molecules generated in the analysis of the cell-free nucleic acid sample, i.e., the histone modification-barcoded dsDNA template, the tagged 5hmC-containing DNA, the tagged 5mC-containing DNA, the untagged DNA, and the adapter-bound cDNA.

In another embodiment, the invention provides a sequencing-based method for determining a non-classical sequence feature of a nucleic acid template molecule, comprising: appending an identifier sequence to the nucleic acid template molecule which designates a specific non-sequence feature of the template molecule; amplifying the nucleic acid template molecule and the appended identifier sequence to give a plurality of amplicons each including the appended identifier sequence; and sequencing the amplicons and determining the non-sequence feature from the sequence reads obtained.

A further embodiment of the invention pertains to a double-stranded DNA template molecule that comprises a protein-specific nucleic acid sequence derived from a known protein analyte in a proximity extension assay and thereby serving as a protein identifier barcode.

Still another embodiment of the invention provides a combination of sample fractions each comprising adapter-ligated, barcoded, double-stranded DNA template molecules derived from a single blood sample, the combination comprising: (a) a plasma-derived sample fraction comprising at least one protein-related dsDNA template molecule, each of which comprises a protein-specific nucleic acid sequence corresponding to a specific protein analyte and thereby serving as a protein identifier barcode; and (b) at least one cfDNA-derived sample fraction comprising a double-stranded cfDNA template molecule obtained from a cell-free nucleic acid sample obtained from the blood sample, wherein the cfDNA template molecule is end-ligated with a set of adapters that comprise a UFI sequence selected from a source identifier barcode, a fragment identifier barcode, a strand identifier barcode, a histone modification barcode, a random barcode, and combinations thereof.

In still a further embodiment of the invention, the aforementioned combination of sample fractions comprises a pooled admixture of the sample fractions, where the DNA template molecules in the admixture may then be amplified and sequenced simultaneously.

In another embodiment of the invention, methods and compositions are provided for improving the efficiency of adapter ligation, in turn improving a process for sequencing DNA. It will be appreciated that the aforementioned methods and compositions of the invention are especially useful in the analysis of cfDNA, insofar as the concentration of DNA in a cell-free sample is already very low. Furthermore, the methods and compositions are particularly useful in the sequencing and quantitation of 5mC-containing DNA and 5hmC-containing DNA, since these modified cytosine residues occur relatively infrequently, representing about 1% and 0.1% of all DNA bases, respectively. Any method for detecting 5mC and 5hmC, and particularly 5hmC, therefore needs to exhibit high efficiency, with respect to the fraction of all 5hmC residues that are identified, as well as high selectivity, meaning that substantially all residues identified as 5mC should, in fact, be 5mC residues, and, similarly, that substantially all residues identified as 5hmC should be 5hmC residues.

In a further embodiment, then, the invention provides improved methods and compositions for sequencing cfDNA, e.g., cfDNA containing 5mC residues, 5hmC residues, or both 5mC and 5hmC residues, where the improvement comprises the use of truncated sequencing adapters that facilitate a single template ligation reaction such that adapter-ligated cfDNA is indexed by sample only upon amplification, e.g., PCR amplification.

In another embodiment, a method is provided for adding an identifier barcode to a dsDNA molecule, comprising:
(a) providing sequencing adapters in the form of a Y-construct having a double-stranded segment comprising in the range of 2 base pairs to 50 base pairs and two single-stranded segments each comprising in the range of 2 bases to 25 bases;
(b) ligating the sequencing adapters to an end-blunted, A-tailed dsDNA template molecule;
(c) amplifying the adapter-ligated dsDNA template molecule in a PCR process using at least one barcoded primer, wherein the barcoded primer comprises: (i) a first region that is not complementary to any sequence in the adapter and comprises an identifier barcode; and (ii) a second region that is sufficiently complementary to a single-stranded segment of the adapter to hybridize thereto, such that extension of the barcoded primer in the presence of a polymerase results in a double-stranded complex of the second region of the primer and the single-stranded segment of the adapter, with the first region comprising the identifier barcode extending beyond the end of the double-stranded complex as a single-stranded oligonucleotide tail.

In a related embodiment, the invention provides a kit for amplifying and sequencing a dsDNA template molecule, comprising:
(a) a sequencing adapter in the form of a Y-construct having a double-stranded segment comprising in the range of 2 base pairs to 50 base pairs and two single-stranded segments each comprising in the range of 2 bases to 25 bases;
(b) a barcoded primer comprising (i) a first region that is not complementary to any sequence in the adapter and comprises an identifier barcode; and (ii) a second region that is sufficiently complementary to a single-stranded segment of the adapter to hybridize thereto; and
(c) a polymerase.

BRIEF DESCRIPTION OF THE DRAWINGS

FIG. 6 discloses SEQ ID NOS 11, 15-16, and 12, respectively, in order of appearance.

FIG. 7 discloses SEQ ID NOS 17, 15, 10 and 18, respectively, in order of appearance.

DETAILED DESCRIPTION OF THE INVENTION

Figure 1:
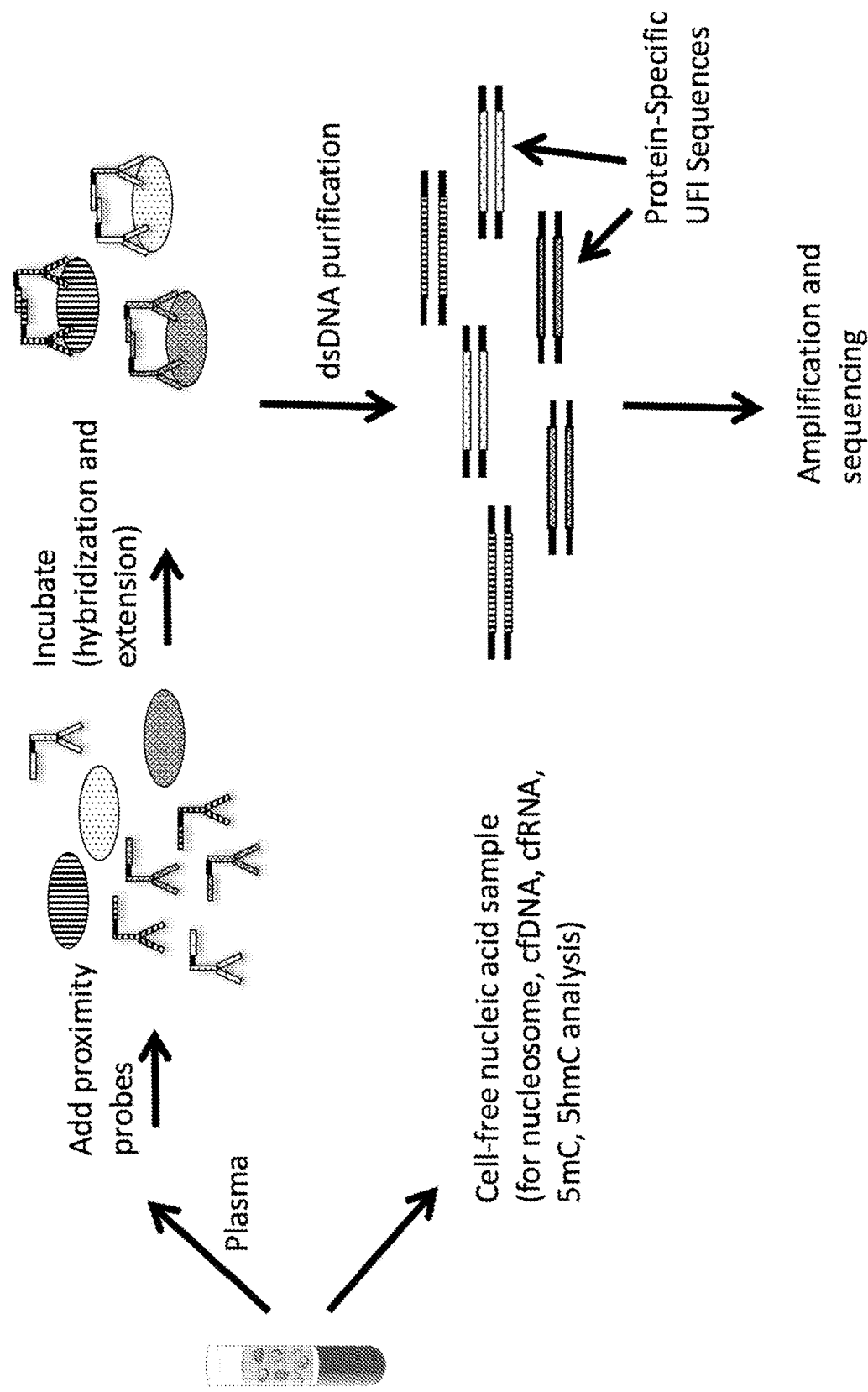
FIG. 1 schematically illustrates the conversion of information regarding a protein analyte in a biological sample to classical sequence information using a proximity extension assay and protein UFI sequences.

1. Terminology and Overview:

Unless defined otherwise, all technical and scientific terms used herein have the meaning commonly understood by one of ordinary skill in the art to which the invention pertains. Specific terminology of particular importance to the description of the present invention is defined below. Other relevant terminology is defined in International Patent Publication No. WO 2017/176630 to Quake et al. for "Non-invasive Diagnostics by Sequencing 5-Hydroxymethylated Cell-Free DNA." The aforementioned patent publication as well as all other patent documents and publications referred to herein are expressly incorporated by reference.

In this specification and the appended claims, the singular forms "a," "an" and "the" include plural referents unless the context clearly dictates otherwise. Thus, for example, "an adapter" refers not only to a single adapter but also to two or more adapters that may be the same or different, "a template molecule" refers to a single template molecule as well as a plurality of template molecules, and the like.

Numeric ranges are inclusive of the numbers defining the range. Unless otherwise indicated, nucleic acids are written left to right in 5' to 3' orientation; amino acid sequences are written left to right in amino to carboxy orientation, respectively.

The headings provided herein are not limitations of the various aspects or embodiments of the invention. Accordingly, the terms defined immediately below are more fully defined by reference to the specification as a whole.

Unless defined otherwise, all technical and scientific terms used herein have the same meaning as commonly understood by one of ordinary skill in the art to which this invention belongs. Singleton, et al., Dictionary of Microbiology and Molecular Biology, 2d Ed. (New York: John Wiley and Sons, 1994), and Hale & Markham, The Harper Collins Dictionary of Biology (New York: Harper Perennial, 1991) provide one of ordinary skill in the art with the general meaning of many of the terms used herein. Still, certain terms are defined below for the sake of clarity and ease of reference.

The term "sample" as used herein relates to a material or mixture of materials, typically, although not necessarily, in liquid form, containing one or more analytes of interest.

The term "biological sample" as used herein relates to a sample derived from a biological fluid, cell, tissue, or organ of a human subject, comprising a mixture of biomolecules including proteins, peptides, lipids, nucleic acids, and the like. Generally, although not necessarily, the sample is a blood sample such as a whole blood sample, a serum sample, or a plasma sample.

A "nucleic acid sample" as that term is used herein refers to a biological sample comprising nucleic acids. The nucleic acid sample may be a cell-free nucleic acid sample that comprises nucleosomes, in which case the nucleic acid sample is sometimes referred to herein as a "nucleosome sample." The nucleic acid sample may also be comprised of cell-free DNA wherein the sample is substantially free of histones and other proteins, such as will be the case following cell-free DNA purification. The nucleic acid samples herein may also contain cell-free RNA.

A "sample fraction" refers to a subset of an original biological sample, and may be a compositionally identical portion of the biological sample, as when a blood sample is divided into identical fractions. Alternatively, the sample fraction may be compositionally different, as will be the case when, for example, certain components of the biological sample are removed, with extraction of cell-free nucleic acids being one such example.

As used herein, the term "cell-free nucleic acid" encompasses both cell-free DNA and cell-free RNA, where the cell-free DNA and cell-free RNA may be in a cell-free fraction of a biological sample comprising a body fluid. The body fluid may be blood, including whole blood, serum, or plasma, or it may be urine, cyst fluid, or another body fluid. In many instances, the biological sample is a blood sample, and a cell-free nucleic acid sample is extracted therefrom using now-conventional means known to those of ordinary skill in the art and/or described in the pertinent texts and literature; kits for carrying out cell-free nucleic acid extraction are commercially available (e.g., the AllPrep® DNA/RNA Mini Kit and QIAmp DNA Blood Mini Kit, both available from Qiagen, or the MagMAX Cell-Free Total Nucleic Acid Kit and the MagMAX DNA Isolation Kit, available from ThermoFisher Scientific). Also see, e.g., Hui et al. Fong et al. (2009) (lin. Chem. 55 (3): 587-598

The term "nucleotide" is intended to include those moieties that contain not only the known purine and pyrimidine bases, but also other heterocyclic bases that have been modified. Such modifications include methylated purines or pyrimidines, acylated purines or pyrimidines, alkylated riboses or other heterocycles. In addition, the term "nucleotide" includes those moieties that contain hapten or fluorescent labels and may contain not only conventional ribose and deoxyribose sugars, but other sugars as well. Modified nucleosides or nucleotides also include modifications on the sugar moiety, e.g., wherein one or more of the hydroxyl groups are replaced with halogen atoms or aliphatic groups, or are functionalized as ethers, amines, or the like. Of particular interest herein are modified cytosine residues, including 5-methylcytosine and oxidized forms thereof, such as 5-hydroxymethylcytosine, 5-formylcytosine, and 5-carboxymethylcytosine.

The term "nucleic acid" and "polynucleotide" are used interchangeably herein to describe a polymer of any length, e.g., greater than about 2 bases, greater than about 10 bases, greater than about 100 bases, greater than about 500 bases, greater than 1000 bases, and up to about 10,000 or more bases composed of nucleotides, e.g., deoxyribonucleotides or ribonucleotide. Nucleic acids may be produced enzymatically, chemically synthesized, or naturally obtained.

The term "oligonucleotide" as used herein denotes a single-stranded multimer of nucleotide of from about 2 to 200 nucleotides, up to 500 nucleotides in length. Oligonucleotides may be synthetic or may be made enzymatically, and, in some embodiments, are 30 to 150 nucleotides in length. Oligonucleotides may contain ribonucleotide monomers (i.e., may be oligoribonucleotides) and/or deoxyribonucleotide monomers. An oligonucleotide may be 10 to 20, 21 to 30, 31 to 40, 41 to 50, 51 to 60, 61 to 70, 71 to 80, 80 to 100, 100 to 150 or 150 to 200 nucleotides in length, for example.

The term "hybridization" refers to the process by which a strand of nucleic acid joins with a complementary strand through base pairing as known in the art. A nucleic acid is considered to be "selectively hybridizable" to a reference nucleic acid sequence if the two sequences specifically hybridize to one another under moderate to high stringency hybridization and wash conditions. Moderate and high stringency hybridization conditions are known (see, e.g., Ausubel, et al., Short Protocols in Molecular Biology, 3rd ed., Wiley & Sons 1995 and Sambrook et al., Molecular Cloning: A Laboratory Manual, Third Edition, 2001 Cold Spring Harbor, N.Y.).

The terms "duplex" and "duplexed" are used interchangeably herein to describe two complementary polynucleotides that are base-paired, i.e., hybridized together. A DNA duplex is referred to herein as "double-stranded DNA" or "dsDNA" and may be an intact molecule or a molecular segment. For example, the dsDNA herein referred to as barcoded and adapter-ligated is an intact molecule, while the dsDNA formed between the nucleic acid tails of proximity probes in a proximity extension assay is a dsDNA segment.

The term "strand" as used herein refers to a single strand of a nucleic acid made up of nucleotides covalently linked together by covalent bonds, e.g., phosphodiester bonds. In a cell, DNA usually exists in a double-stranded form, and as such, has two complementary strands of nucleic acid referred to herein as the "top" and "bottom" strands. In certain cases, complementary strands of a chromosomal region may be referred to as "plus" and "minus" strands, "positive" and "negative" strands, the "first" and "second" strands, the "coding" and "noncoding" strands, the "Watson" and "Crick" strands or the "sense" and "antisense" strands. The assignment of a strand as being a top or bottom strand is arbitrary and does not imply any particular orientation, function or structure. The nucleotide sequences of the first strand of several exemplary mammalian chromosomal regions (e.g., BACs, assemblies, chromosomes, etc.) is known, and may be found in NCBI's Genbank database, for example.

The term "primer" refers to a synthetic oligonucleotide, which, upon forming a duplex with a polynucleotide template, is capable of acting as a point of initiation of nucleic acid synthesis and being extended from its 3' end along the template so that an extended duplex is formed. The sequence of nucleotides added during the extension process is determined by the sequence of the template polynucleotide. Usually primers are extended by a DNA polymerase. Primers are generally of a length compatible with their use in synthesis of primer extension products, and are usually in the range of between 8 to 100 nucleotides in length, such as 10 to 75, 15 to 60, 15 to 40, 18 to 30, 20 to 40, 21 to 50, 22 to 45, 25 to 40, and so on. Typical primers can be in the range of between 10-50 nucleotides long, such as 15-45, 18-40, 20-30, 21-25 and so on, and any length between the stated ranges. In some embodiments, the primers are usually not more than about 10, 12, 15, 20, 21, 22, 23, 24, 25, 26, 27, 28, 29, 30, 35, 40, 45, 50, 55, 60, 65, or 70 nucleotides in length.

Like "primers," used to prime DNA replication reactions, "adapters" are also short synthetic oligonucleotides that serve a specific purpose in a biological analysis. Adapters can be single-stranded or double-stranded, although the preferred adapters herein are double-stranded. In one embodiment, an adapter may be a hairpin adapter (i.e., one molecule that base pairs with itself to form a structure that has a double-stranded stem and a loop, where the 3' and 5' ends of the molecule ligate to the 5' and 3' ends of a double-stranded DNA molecule, respectively). In another embodiment, an adapter may be a Y-adapter. In another embodiment, an adapter may itself be composed of two distinct oligonucleotide molecules that are base paired with each other. As would be apparent, a ligatable end of an adapter may be designed to be compatible with overhangs made by cleavage by a restriction enzyme, or it may have blunt ends or a 5' T overhang. The term "adapter" refers to double-stranded as well as single-stranded molecules. An adapter can be DNA or RNA, or a mixture of the two. An adapter containing RNA may be cleavable by RNase treatment or by alkaline hydrolysis. An adapter may be 15 to 100 bases, e.g., 50 to 70 bases, although adapters outside of this range are envisioned.

The term "adapter-ligated," as used herein, refers to a nucleic acid that has been ligated to an adapter. The adapter can be ligated to a 5' end and/or a 3' end of a nucleic acid molecule. As used herein, the term "adding adapter sequences" refers to the act of adding an adapter sequence to the end of fragments in a sample. This may be done by filling in the ends of the fragments using a polymerase, adding an A tail, and then ligating an adapter comprising a T overhang onto the A-tailed fragments. Adapters are usually ligated to a DNA duplex using a ligase, while with RNA, adapters are covalently or otherwise attached to at least one end of a cDNA duplex preferably in the absence of a ligase.

The term "asymmetric adapter", as used herein, refers to an adapter that, when ligated to both ends of a double stranded nucleic acid fragment, will lead to a top strand that contains a 5' tag sequence that is not the same as or complementary to the tag sequence at the 3' end. Examples of asymmetric adapters are described in U.S. Pat. Nos. 5,712,126 and 6,372,434 to Weissman et al., and International Patent Publication No. WO 2009/032167 to Bignell et al. An asymmetrically tagged fragment can be amplified by two primers: a first primer that hybridizes to a first tag sequence added to the 3' end of a strand; and a second primer that hybridizes to the complement of a second tag sequence added to the 5' end of a strand. Y-adapters and hairpin adapters (which can be cleaved, after ligation, to produce a "Y-adapter") are examples of asymmetric adapters.

The term "Y-adapter" refers to an adapter that contains: a double-stranded region and a single-stranded region in which the opposing sequences are not complementary. The end of the double-stranded region can be joined to target molecules such as double-stranded fragments of genomic DNA, e.g., by ligation or a transposase-catalyzed reaction. Each strand of an adapter-tagged double-stranded DNA that has been ligated to a Y-adapter is asymmetrically tagged in that it has the sequence of one strand of the Y-adapter at one end and the other strand of the Y-adapter at the other end. Amplification of nucleic acid molecules that have been joined to Y-adapters at both ends results in an asymmetrically tagged nucleic acid, i.e., a nucleic acid that has a 5' end containing one tag sequence and a 3' end that has another tag sequence.

The term "hairpin adapter" refers to an adapter that is in the form of a hairpin. In one embodiment, after ligation the hairpin loop can be cleaved to produce strands that have non-complementary tags on the ends. In some cases, the loop of a hairpin adapter may contain a uracil residue, and the loop can be cleaved using uracil DNA glycosylase and endonuclease VIII, although other methods are known.

The term "adapter-ligated sample", as used herein, refers to a sample that has been ligated to an adapter. As would be understood given the definitions above, a sample that has been ligated to an asymmetric adapter contains strands that have non-complementary sequences at the 5' and 3' ends.

The term "amplifying" as used herein refers to generating one or more copies, or "amplicons," of a template nucleic acid, such as may be carried out using any suitable nucleic acid amplification technique, such as technology, such as PCR (polymerase chain reaction) amplification (including nested PCR and multiplex PCR), RCA (rolling circle amplification), NASBA (nucleic acid sequence-based amplification), TMA (transcript mediated amplification), and SDA (strand displacement amplification). It will be appreciated that a combination of amplification techniques can be advantageously used in certain contexts, e.g., multiplex PCR combined with RCA (see, e.g., Gong et al. (2018) RS C Adv. 8:27375), RCA combined with quantitative PCR (qPCR) (see, e.g., Liu et al. (2016) Anal Sci. 32:963-968), and the like.

The terms "enrich" and "enrichment" refer to a partial purification of template molecules that have a certain feature (e.g., nucleic acids that contain 5-hydroxymethylcytosine) from analytes that do not have the feature (e.g., nucleic acids that do not contain hydroxymethylcytosine). Enrichment typically increases the concentration of the analytes that have the feature by at least 2-fold, at least 5-fold or at least 10-fold relative to the analytes that do not have the feature. After enrichment, at least 10%, at least 20%, at least 50%, at least 80% or at least 90% of the analytes in a sample may have the feature used for enrichment. For example, at least 10%, at least 20%, at least 50%, at least 80% or at least 90% of the nucleic acid molecules in an enriched composition may contain a strand having one or more hydroxymethylcytosines that have been modified to contain a capture tag.

The term "sequencing," as used herein, refers to a method by which the identity of at least 10 consecutive nucleotides (e.g., the identity of at least 20, at least 50, at least 100 or at least 200 or more consecutive nucleotides) of a polynucleotide is obtained.

The terms "next-generation sequencing" (NGS) or "high-throughput sequencing", as used herein, refer to the so-called parallelized sequencing-by-synthesis or sequencing-by-ligation platforms currently employed by Illumina, Life Technologies, Roche, etc. Next-generation sequencing methods may also include nanopore sequencing methods such as that commercialized by Oxford Nanopore Technologies, electronic detection methods such as Ion Torrent technology commercialized by Life Technologies, and single-molecule fluorescence-based methods such as that commercialized by Pacific Biosciences.

The term "read" as used herein refers to the raw or processed output of sequencing systems, such as massively parallel sequencing. In some embodiments, the output of the methods described herein is reads. In some embodiments, these reads may need to be trimmed, filtered, and aligned, resulting in raw reads, trimmed reads, aligned reads.

A "UFI" is a unique feature identifier that characterizes a group of nucleic acid molecules. A UFI may be a particular sequence of nucleic acids in what is sometimes referred to as a "barcode" (sometimes referred to herein as a "UFI sequence" or "UFI barcode") or it may be a chemical tag as will result from glycosylation, biotinylation, or the like. A UFI may also be the absence of a particular feature such as an appended or incorporated moiety; for instance, a UFI may be the absence of a particular barcode, or the absence of glycosylated or biotinylated moieties, or the like. A UFI sequence is typically a relatively short nucleic acid sequence that serves to identify a feature of a nucleic acid molecule. Nucleic acid template molecules and amplicons thereof that contain a UFI are sometimes referred to herein as "barcoded" template molecules or amplicons. Examples of UFI sequence types include, without limitation, the following:

A "molecular UFI sequence" (or "molecular barcode") is a short sequence of nucleic acids that is appended to every nucleic acid template molecule in a sample, such that, providing the UFI sequence is of sufficient length, every nucleic acid template molecule is attached to a unique UFI sequence. The molecular UFI sequences are usually designed as a string of random nucleotides, partially degenerate nucleotides, or, in some cases, i.e., with a limited number of template molecules, defined nucleotides. Molecular UFI sequences, as is known in the art, can be used to account for and offset amplification and sequencer errors, allow a user to track duplicates and remove them from downstream analysis, enable molecular counting, and, in turn, the determination of an analyte concentration. See, e.g., Casbon et al. (2011) Nuc. Acids Res. 39 (12): 1-8.

A "sample UFI sequence" (or "sample barcode" or "indexed UFI") is a sequence of nucleic acids that is appended to every nucleic acid template molecule in a sample, such that a plurality of samples can be combined, processed, and sequenced together, with the sample UFI sequence enabling the sorting and grouping of reads by sample (i.e., de-multiplexing). A sample UFI sequence identifies the individual from whom the sample was obtained.

A "source identifier sequence" (or "source UFI" or "source barcode") identifies the source of origin. A source UFI will normally be a sample UFI. In certain instances, however, for example when different types of samples are obtained from the same individual (e.g., blood sample, cyst fluid, or the like), a source UFI will indicate the physiological source of the sample rather than the patient from whom the sample was obtained. When multiple samples are combined that include two or more sample types obtained from a single individual, both a sample barcode and a source barcode should be used.

A "fragment identifier sequence" (or "fragment UFI" or "fragment barcode"): In a nucleic acid sample in which nucleic acids comprise a population of many fragments (as occurs naturally in cell-free DNA, or can be engineered through multiple known fragmentation techniques (e.g., physical, sonication, enzymatic, etc.), each fragment in a sample is barcoded with a corresponding fragment identifier sequence. Sequence reads that have non-overlapping fragment identifier sequences represent different original nucleic acid template molecules, while reads that have the same fragment identifier sequences, or substantially overlapping fragment identifier sequences, likely represent fragments of the same template molecule. The unique feature identified here is the template nucleic acid molecule from which a fragment derives.

A "strand identifier sequence" (or "strand UFI" or "strand barcode") independently tags each of the two strands of a DNA duplex, so that the strand from which a read originates can be determined, i.e., as the W strand or the C strand.

A "protein identifier sequence" (or "protein UFI" or "protein barcode") is contained within, adjacent to, or near the hybridized region formed between the nucleic acid tails of a pair of proximity probes in the presence of the corresponding protein to which the proximity probes specifically bind. The protein identifier sequence, when read, thus identifies the presence of the protein analyte targeted by a pair of proximity probes.

A "histone modification identifier sequence" (or "histone modification UFI" or "histone modification barcode") is used in the cell-free chromatin immunoprecipitation (cfChIP) technique described herein to identify histone modifications identified in a nucleosome. The histone modification identifier sequence is contained within, adjacent to, or near the hybridized region formed between the nucleic acid tail of a probe, i.e., at the first terminus of the probe, and a terminus of the DNA wrapped around the histone. The other terminus of the probe binds to a histone modification of interest. Accordingly, the histone modification identifier sequence, when read, identifies the presence of the histone modification.

A "5hmC identifier sequence" (or "5hmC barcode") identifies DNA fragments originating from 5hmC-containing cell-free DNA template molecules in a sample, i.e., "hydroxymethylated" DNA.

A "5mC identifier sequence" (or "5mC barcode") identifies DNA fragments originating from 5mC-containing cell-free DNA template molecules that do not contain 5hmC.

A "cell-free RNA identifier sequence" (or "cfRNA UFI") identifies cDNA fragments as originating from cfRNA template molecules.

These and other UFIs provide the basis for conversion of a non-classical sequence feature—such as the presence and concentration of plasma proteins, the location and type of histone modifications, hydroxymethylation profile, methylation profile, and the like—to classical sequence data from which the non-classical sequence feature can be derived. The application is not limited to the aforementioned types of UFIs, and other types of UFIs are also envisioned. Many types of "process identifier sequences," or "process UFIs," for example, may be used to identify any one of a number of processes used to partition an initial pool of non-amplified template DNA fragments based on non-sequence features. In addition to histone modification UFIs, protein UFIs, and epigenetic UFIs (including 5hmC UFIs and 5mC UFIs), all of which may be characterized as process UFIs, there are other types of UFIs that can be advantageously used in conjunction with the present invention, including UFIs indicating the presence or identity of adjacent genomic regions outside the sequence of a template molecule, such as CTCF binding sites across genomic spans.

In some embodiments, a UFI may have a length in the range of from 1 to about 35 nucleotides, e.g., from 2 to 30 nucleotides, 4 to 30 nucleotides, 4 to 24 nucleotides, 4 to 16 nucleotides, 4 to 12 nucleotides, 6 to 20 nucleotides, 6 to 16 nucleotides, 6 to 12 nucleotides, etc. In certain cases, as noted above, the UFI may be error-detecting and/or error-correcting, meaning that even if there is an error (e.g., if the sequence of the molecular barcode is mis-synthesized, mis-read or distorted during any of the various processing steps leading up to the determination of the molecular barcode sequence) then the code can still be interpreted correctly. The use of error-correcting sequences is described in the literature (e.g., in U.S. Patent Publication Nos. U.S. 2010/0323348 to Hamati et al. and U.S. 2009/0105959 to Braverman et al., both of which are incorporated herein by reference).

The oligonucleotides that serve as UFI sequences herein may be incorporated into DNA molecule using any effective means, where "incorporated into" is used interchangeably herein with "added to" and "appended to," insofar as the UFI can be provided at the end of a DNA molecule, near the end of a DNA molecule, or within a DNA molecule. For example, multiple UFIs can be end-ligated to DNA using a selected ligase, in which case only the final UFI is at the "end" of the molecule. In addition, in the proximity extension assay and histone modification methods described in detail infra, the UFI may be contained within the nucleic acid tail of a proximity probe, at the end of the nucleic acid tail of a proximity probe, or within the hybridized region generated upon the binding of probes to the protein target.

The term "protein analyte" as used herein encompasses a plurality of peptidic species, including oligopeptides, polypeptides, and proteins, where, as an analyte, the species of interest may or may not be present in a particular sample. Accordingly, the "detection" of an analyte in a sample herein may involve detecting the presence or absence of the analyte, confirming the likely presence of the analyte, ascertaining the concentration of the detected analyte, or the like.

More generally, the term "detection" is used interchangeably with the terms "determining," "measuring," "evaluating," "assessing," "assaying," and "analyzing," to refer to any form of measurement, and include determining if an element is present or not. These terms include both quantitative and/or qualitative determinations. Assessing may be relative or absolute. "Assessing the presence of" thus includes determining the amount of a moiety present, as well as determining whether it is present or absent.

A "hydroxymethylation level" or "hydroxymethylation state" is the extent of hydroxymethylation within a locus of interest. The extent of hydroxymethylation is normally measured as hydroxymethylation density, e.g., the ratio of 5hmC residues to total cytosines, both modified and unmodified, within a nucleic acid region. Other measures of hydroxymethylation density are also possible, e.g., the ratio of 5hmC residues to total nucleotides in a nucleic acid region.

A "hydroxymethylation profile" or "hydroxymethylation signature" refers to a data set that comprises the hydroxymethylation level at each of a plurality of hydroxymethylation loci.

2. Protein Analyte Detection:

In a first embodiment, a method is provided for detecting a protein analyte in a biological sample, and may involve detection of the presence of the protein analyte as well as quantitation, i.e., determination of the amount or concentration of the analyte. As with other methods described herein, the information sought and obtained is derived from sequence reads generated by an appropriately barcoded nucleic acid template molecule. It will be appreciated that the method extends to the detection of each of a plurality of protein analytes in a sample, as will be described below.

The proximity ligation assay (PLA) and proximity extension assay (PEA) are established methods used for the detection and quantification of proteins in complex biological samples. PLA involves binding a protein analyte to two "proximity probes," which are antibodies coupled with DNA strands. When the strands are in sufficiently close proximity, as occurs when the probes are bound to the target analyte, they are united with a DNA ligase enzyme. The ligation product then serves as a template for quantitative PCR (qPCR), reflecting the amount of the protein analyte present. The PEA method is also known in the detection and quantification of protein analytes, and provides a significant improvement over PLA, insofar as PLA results in noticeable recovery loss, particularly with complex biological samples; see, e.g., Lundberg et al. (2011) Nuc. Acids. Res. 39 (15): 1-8. Like PLA, PEA relies on the use of two proximity probes, each of which is essentially an antibody coupled to a DNA strand. In PEA, the DNA "tail" of one probe of a probe pair hybridizes to the DNA tail of the other probe of the pair, resulting in a double-stranded DNA (dsDNA) segment formed between the probes, with a 5' terminus originating with the first proximity probe of the pair. A polymerase and a mixture of dNTPs is then employed to extend the 5' terminus of the dsDNA segment along the second proximity probe. As with the PLA assay, the proximity extension product is then used, in conventional protein assays, as a template for qPCR to quantitate the analyte of interest.

The present invention eliminates the need for quantitative PCR and instead uses sequencing, typically NGS, to detect and quantitate at least one protein analyte in a biological sample. The sequenced nucleic acid product generated with the improved proximity extension assay of the invention is an amplified protein-barcoded dsDNA template molecule, i.e., a dsDNA amplicon (or PCR product) that comprises a protein-specific UFI sequence. That protein-barcoded amplicon is sequenced, and the sequence reads deconvoluted to determine the presence and quantity of a protein analyte from the protein UFI sequences observed in the sequence reads.

In one aspect, the invention provides an improved proximity extension assay for identifying a plurality of protein analytes in a biological sample by providing a plurality of probe pairs each comprising a first proximity probe and a second proximity probe, wherein each probe pair targets a specific protein analyte, and generating a dsDNA segment between the probes of each probe pair in the presence of the corresponding protein analyte, where the improvement comprises the following: incorporating into the dsDNA segments generated between the probes of a probe pair a protein-specific UFI sequence, thereby forming protein-barcoded dsDNA template molecules; amplifying and sequencing the protein-barcoded dsDNA template molecules; and identifying the protein analytes in the biological sample from the protein-specific UFIs observed in the sequence reads generated. Typically, the protein-specific UFI is incorporated into the dsDNA segments by end-ligation of a UFI-containing adapter to at least one end a segment. The method is illustrated schematically in FIG. 1.

Optimally, the protein-barcoded dsDNA template molecule generated in the aforementioned process is also provided with a capture sequence that comprises a 5hmC residue. The capture sequence may be a single 5hmC residue, or it may be a short oligonucleotide sequence that contains a single 5hmC residue, or a short oligonucleotide sequence sequence that contains two or more 5hmC residues. The presence of 5hmC residues allows capture by functionalization of the 5hmCs with an affinity tag such as biotin, which in turn enables removal of the biotinylated species from a sample or fraction thereof with an avidin or streptavidin surface.

It will be appreciated that the protein-barcoded dsDNA template molecules may all have the same capture sequence, while each dsDNA template molecule generated by a different probe pair has a unique protein UFI sequence corresponding to the protein analyte targeted by that probe pair. The protein-specific UFI sequence and the capture sequence can be simultaneously added to the dsDNA template generated between the probes, in a single oligonucleotide sequence or adapter. Alternatively, the protein-specific UFI sequence can be added first, followed by the capture sequence. In order to track duplicates and enable molecular counting, as well as offset amplification and sequencer errors, a molecular UFI sequence can also be appended to each dsDNA template molecule generated by the proximity extension assay, along with the protein-specific UFI and the optional 5hmC-containing capture sequence.

In order to determine the concentration of a protein analyte in a biological sample, the improved proximity extension assay delineated above additionally involves use of a protein concentration control composition. Sequence reads indicative of a specific protein analyte are compared with sequence reads generated by the protein concentration control composition, which is incorporated into the biological sample at the outset. Protein concentration control compositions are known in the art, and include, by way of example, a spike-in control in which a known concentration of a protein is added into the sample prior to processing. In some embodiments, the spike-in control is used in conjunction with a concentration ladder with control compositions having different concentrations throughout a concentration range.

An advantage of the present method in which protein analytes are determined from sequence reads of protein-barcoded dsDNA templates is that a large number of biological samples, e.g., blood samples or fractions thereof, such as plasma samples or serum samples, can be processed simultaneously. At least 50, at least 100, at least 300, at least 500, at least 1000, or at least 1500 or more biological samples can readily be processed at the same time. It may be convenient to provide each sample to be processed in an individual well of a commercially available microwell plate, such as a 96-well, a 384-well, or a 1536-well plate. Another advantage is the capability of carrying out other types of analyses on the same sample and obtaining additional information via sequencing as well, as will be explained in detail infra.

In a variation on the above embodiments, a related method is provided for identifying a plurality of protein analytes in a biological sample using a DNA sequencing-based technique, where the method comprises:

(a) providing a plurality of probe pairs each targeting a specific protein analyte and comprising a protein-binding domain at a first terminus, a nucleic acid binding domain at an opposing second terminus, and a non-hybridizing nucleic acid region therebetween, wherein (i) the protein-binding domains of the first and second proximity probes are capable of simultaneously binding to different binding sites on the same protein analyte, and (ii) the nucleic acid binding domains of the probes are complementary to each other and hybridize to form a dsDNA segment when the first and second proximity probes are both bound to the protein and sufficiently proximal for hybridization to occur;

(b) incubating the biological sample or a fraction thereof with the probe pairs under conditions effective to facilitate (i) binding of the protein-binding domain of each proximity probe within a probe pair to the corresponding protein analyte and (ii) hybridization of the nucleic acid binding domains to each other to form a dsDNA segment with a 5' terminus originating with the first proximity probe and a 3' terminus originating with the second proximity probe;

(c) extending the 5' terminus of the first proximity probe along the second proximity probe by adding a polymerase and a mixture of dNTPs to generate a dsDNA segment between the probes that incorporates a protein-specific nucleic acid sequence to serve as a protein identifier barcode and a capture sequence comprising a 5hmC residue, wherein: (i) the nucleic acid binding region of the first probe, the second probe, or both the first and second probes comprises the capture sequence, the protein identifier barcode, or both the capture sequence and the protein identifier barcode; (ii) the mixture of dNTPs comprises at least one 5hmC residue; and/or (iii) adapters are ligated onto the termini of the dsDNA segment following polymerase extension, wherein at least one adapter comprises the capture sequence, the protein identifier barcode, or both the capture sequence and the protein identifier barcode, thereby forming protein-barcoded dsDNA template molecules each comprising a capture sequence;

(d) amplifying and sequencing the protein-barcoded dsDNA template molecules comprising a capture sequence; and (e) identifying the protein analytes in the biological sample from the protein identifier barcodes observed in the sequence reads generated in step (b).

It will be understood by those skilled in the art that in a proximity probe of the type alluded to, each protein-binding domain comprises an antigen and each binding site comprises an epitope.

It should also be noted that in a preferred version of the aforementioned method, as before, the biological sample is generally a blood sample and the protein analysis is performed on a fraction of the blood sample, such as serum or plasma from the sample, typically plasma. 3. Combination of Protein Assay with Cell-Free Sample Analysis:

In one embodiment, the biological sample is a blood sample, with protein analyte detection carried out on a fraction of the sample, typically the plasma fraction, and other types of analyses carried out, if desired, on a cell-free fraction of the same sample. This is illustrated schematically in FIG. 1. In such a case, the amplified protein-barcoded dsDNA template molecules can be sequenced in a single pool along with other types of amplified, barcoded dsDNA template molecules generated by analysis of the cell-free sample fraction. These other dsDNA template molecules deriving from processing of the cell-free sample fraction can include, for example, template molecules with a histone modification UFI, a 5hmC-related UFI, a 5mC-related UFI, a UFI designating a DNA duplex as cDNA deriving from cell-free RNA, and the like. The various types of barcoded dsDNA template molecules can be pooled prior to amplification, and amplified together in a single run, or the barcoded dsDNA template molecules can be amplified prior to sequencing. The latter method is useful when one type of template molecule is to be amplified to a greater degree than another template molecule, such as with template molecules having a rare feature and thus present at a significantly lower concentration than other template molecules. 5hmC-containing dsDNA template molecules, for example, are at a significantly lower concentration than other template molecules. Pre-amplification of a group of template molecules, followed by pooling and amplification of all template molecules in a single run, is another method appropriate in the same context. Pre-amplification involves separation of a group of template molecules sharing a barcoded feature from the biological sample or admixture of template molecules, followed by re-combination with the remaining template molecules and simultaneous amplification.

The information obtained from a cell-free nucleic acid sample extracted from the same biological sample that contains the protein analytes, in combination with a proximity extension method as described in the preceding section, can include detection of the presence, identity, location, or quantity (or a combination thereof) of one or more histone modifications within nucleosomes in the cell-free nucleic acid sample. Histone modifications include post-translational modifications (PTMs), many of which have been established to regulate gene expression by altering chromatin structure or by other means. Histone modifications of particular interest herein are those comprising histone modification biomarkers for assessing a disease status in a subject. Methods for detecting histone modifications according to this and other embodiments of the invention are described in the next section.

Other information obtained from the cell-free sample can include: at least one sequence of cell-free DNA; at least one sequence of cell-free RNA; DNA methylation data; DNA hydroxymethylation data; and other information that may or may not be related to any of the foregoing. Detailed information regarding appropriate and preferred methodologies for obtaining the foregoing information is included infra.

4. Detection of Histone Modifications Using Cell-Free ChIP (cfChIP):

In another embodiment of the invention, methods are provided for (1) preparing a cell-free nucleic acid sample to enable identification of at least one histone modification in a nucleosome contained therein using a sequencing-based technique, and (2) detecting histone modifications in a cell-free nucleic acid sample containing intact nucleosomes, where the presence, identity, location or quantity of the histone modifications, or a combination thereof, are detected. Both methods involve analysis of a cell-free nucleic acid sample extracted from a biological sample such as a blood sample, where the cell-free nucleic acid sample contains intact nucleosomes.

The nucleosome is the basic unit of chromatin structure and is composed of a protein complex of eight highly conserved core histones, with two copies of each of the core histones H2A, H2B, H3, and H4. Approximately 146 base pairs of DNA are wrapped around the histone octamer to form the nucleosome "core." The core particles are connected by stretches of linker DNA, up to about 80 base pairs in length, which appear like "beads on a string" (Koller et al. (1979) J. Cell Biol. 83 (2 Pt 1): 403-427) until compacted with linker histones such as H1, H5, or their isoforms, to form chromatin.

Nucleosome position and nucleosome structure (in terms of both constituent histone protein variants and post-translational modifications, or PTMs) are also known to mediate epigenetic signaling. Histone PTMs have been linked to a variety of processes, including transcription, DNA replication, and DNA damage. PTMs are typically located on the tails of the core histones, and include acetylation, methylation, dimethylation, trimethylation, propionylation, butyrylation, crotonylation, 2-hydroxy-isobutyrylation, malonylation, succinylation, formylation, ubiquitination, citrullination, phosphorylation, hydroxylation, sumoylation, O-GlcNAcylation, and ADP ribosylation, and the more common modifications include the acetylation, methylation or ubiquitination of lysine residues as well as methylation of arginine residues and phosphorylation of serine residues. Comprehensive lists of PTMs whose functions have been fairly well established are set forth in Zhao et al. (2015), "Appendix 2-Comprehensive catalog of currently documented histone modifications," Cold Spring Harbor perspectives in biology. 2015;7 (9): a025064, the disclosure of which is incorporated by reference herein; also see the Histone Modification Poster available from Reaction Biology Corp, which provides a histone modification map for ready reference [retrieved on Aug. 5, 2018 from www.reactionbiology.com/webapps/site/].

Mononucleosomes and oligonucleosomes have been detected by ELISA, as reported in Salgame et al. (1997) Nuc. Acids. Res. 25 (3): 680-1 and van Nieuwenhuijze et al. (2003) Ann. Rheum. Dis. 62 (1): 10-14. Such assays typically employ an anti-histone antibody, such as anti-H2B, anti-H3 or anti-H1, H2A, H2B, H3 and H4, as capture antibody and an anti-DNA or anti-H2A-H2B-DNA complex antibody as detection antibody. These methodologies and others that have been developed, however, tend to be of limited reliability.

The present method, a "cell-free chromatin immunoprecipitation" (cfChIP) assay, differs from the now-conventional ChIP methodologies, which analyze the intracellular interaction between proteins and DNA by crosslinking DNA and associated proteins in chromatin in living cells or tissues, shearing the crosslinked complexes by sonication or digestion, immunoprecipitating the crosslinked protein-DNA fragments that result, purifying and sequencing the fragments, and determining from the sequence reads information about the interactions between proteins and DNA in the cell. A number of variations on this basic procedure have been developed with different applications in mind, including Native ChIP (NChIP), Bead-free ChIP, Carrier ChIP (CChIP), Fast ChIP (qChIP), Quick and Quantitative ChIP ($Q^2$ChIP), MicroChIP (uChIP), Matrix ChIP, Pathology-ChIP (PAT-ChIP), among others.

In one embodiment, the invention provides a method for preparing a cell-free nucleic acid sample to enable identification of at least one histone modification in a nucleosome contained therein using a DNA sequencing-based technique, where the method involves starting with a cell-free nucleic acid sample containing a plurality of nucleosomes each comprising a cfDNA molecule wound around a histone core, i.e., around the histone octamer composed of a pair of each of the four core histones. Adapters (e.g., Y adapters), comprising terminal hybridizing regions are ligated to the ends of each histone-associated cfDNA molecule. The adapters may contain a sample UFI sequence and a molecular UFI sequence as explained earlier herein. Ligation of adapters is illustrated at the top of FIG. 2, and results in a modified cell-free nucleic acid sample comprising adapter-ligated cfDNA molecules each wound around a histone core.

Figure 2:
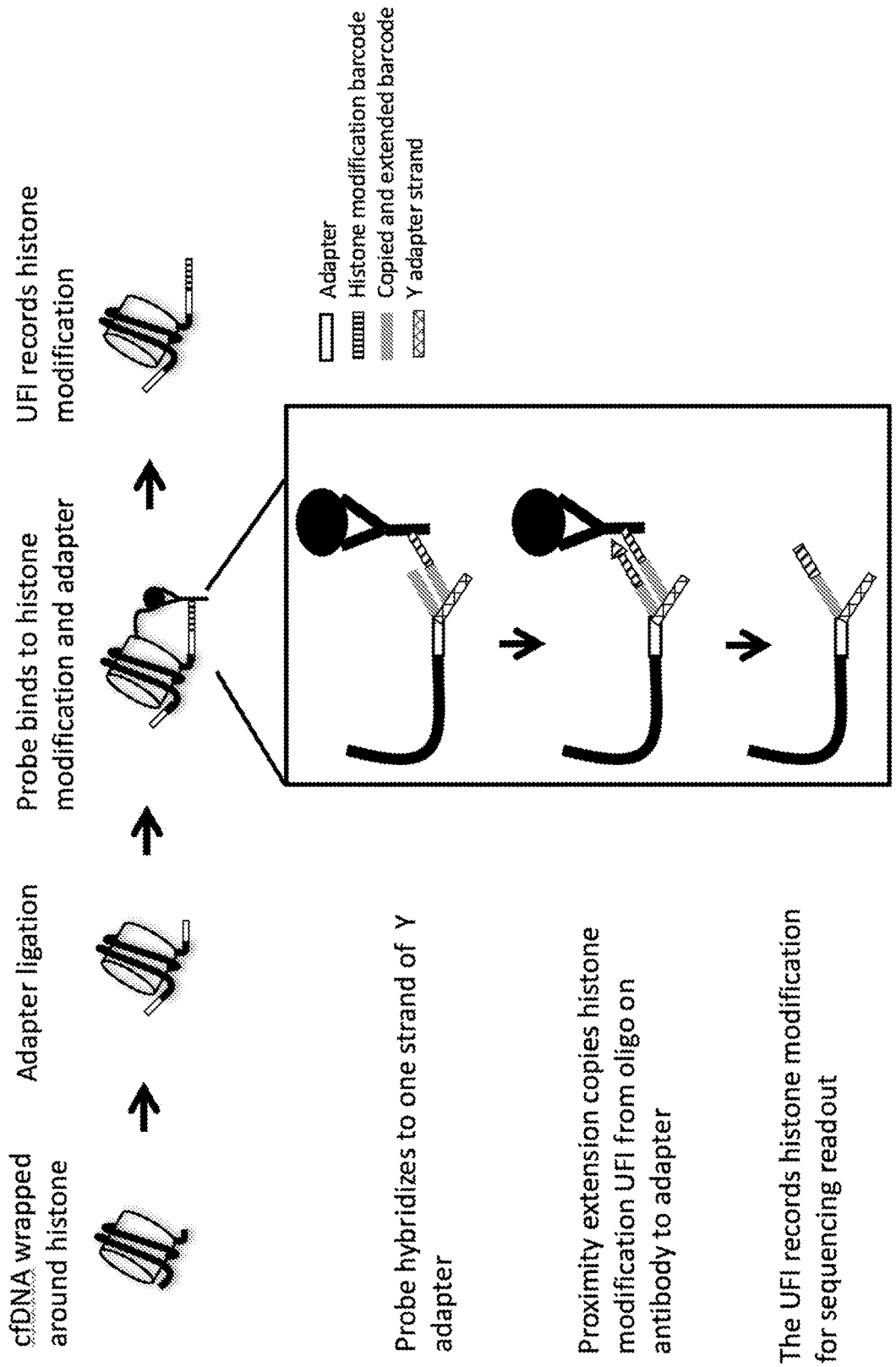
FIG. 2 schematically illustrates the use of a cell-free ChIP (cfChIP) method to convert information regarding histone modifications in a nucleosome to classical sequence information using proximity probes and histone modification UFI sequences.

In the next step of the method, also illustrated in FIG. 2, a proximity probe is employed that comprises, at a first terminus, a histone modification binding domain that specifically binds to a histone modification of interest; and at a second terminus, a nucleic acid binding domain complementary to one of the terminal hybridizing region provided by the adapters. A non-hybridizing region between the histone modification binding domain and the nucleic acid binding domain comprises a nucleic acid sequence selected to correspond to the histone modification of interest, and this nucleic acid sequence serves as a histone modification UFI (or histone modification "barcode"). The proximity probe is dimensioned to allow for simultaneous binding of the probe's histone modification binding domain to the histone modification of interest and hybridization of the probe's complementary nucleic acid binding domain to the hybridizing nucleic acid region. To effect simultaneous binding, the modified cell-free nucleic acid sample is incubated with the proximity probe under conditions effective to facilitate (i) binding of the probe's histone modification binding domain to the histone modification and (ii) hybridization of the probe's complementary nucleic acid binding domain to the hybridizing nucleic acid region. This results in the formation of a dsDNA segment with a 5' terminus originating with the cell-free DNA and a 3' terminus originating with the proximity probe and comprising the histone modification barcode.

Following formation of the dsDNA segment, the 5' terminus of the dsDNA segment is extended along the non-hybridizing region of the proximity probe and the histone modification UFI by adding a polymerase and a mixture of dNTPs, in a manner similar to that described for the proximity extension assay in part (2) of this section. Polymerase extension provides a histone modification-barcoded dsDNA template molecule, typically also barcoded with a sample UFI sequence and a molecular UFI sequence as noted above, which can then undergo amplification and sequencing.

Usually, the aforementioned cfChIP process involves the use of a plurality of proximity probes each targeting a different histone modification, so that the sequence reads obtained in the final step can be deconvoluted to deduce information about a plurality of histone modifications such as histone PTMs.

In another, related embodiment, a sequencing-based method is provided for detecting histone modifications in a cell-free nucleic acid sample containing intact nucleosomes, where the presence, identity, location or quantity of histone modifications, or a combination thereof, are detected. The method involves carrying out the above method for preparing a cell-free nucleic acid sample to enable identification of at least one histone modification using a DNA sequencing-based technique, followed by amplification of the histone modification-barcoded dsDNA template molecule, sequencing of the resulting amplicons, and determining information about the type and location of histone modifications from the histone modification UFIs observed in the sequence reads.

5. Adapters with 5hmC-Containing Capture Sequences:

In several embodiments, reference is made to the use of adapters that include a capture sequence comprising at least one 5hmC residue. This is an optional feature of many of the embodiments herein, and is particularly useful in a combined workflow method in which specific adaptor-ligated dsDNA template molecules are pulled down from a sample or from a mixture of dsDNA template molecules, with the remaining components then processed in the absence of the removed dsDNA template. The pulled-down template molecules can be separately amplified or just set aside while the remainder of the sample undergoes chemical processing, with, ultimately, all dsDNA template molecules generated from a single sample pooled and sequenced together. The capture sequence incorporated into a dsDNA template molecule by way of an adaptor facilitates the pull-down, or removal, of the dsDNA template molecule from the sample.

The capture sequence comprises a 5hmC residue; the sequence may be a single 5hmC residue, a short nucleic acid sequence containing a single 5hmC residue, or a short nucleic acid sequence containing two or more 5hmC residues.

In one embodiment, an adapter containing a 5hmC-containing capture sequence is ligated to at least one end of a dsDNA template molecule, or, in a cfRNA, analysis, is attached via ligase-free chemistry to at least one end of a cDNA molecule. When the adapter-bound dsDNA template molecule is to be pulled down, 5hmC residues in the adapters are functionalized with an affinity tag that allows selective removal of the affinity-tagged template. In one embodiment, the affinity tag is comprised of a biotin moiety such as biotin, desthiobiotin, oxybiotin, 2-iminobiotin, diaminobiotin, biotin sulfoxide, biocytin, or the like. Use of a biotin moiety as the affinity tag allows for facile removal with an avidin or streptavidin surface, e.g., streptavidin beads, magnetic streptavidin beads, etc.

Tagging 5hmC residues with a biotin moiety or other affinity tag is accomplished by covalent attachment of a chemoselective group to 5hmC residues in the adapters, where the chemoselective group is capable of undergoing reaction with a functionalized affinity tag so as to link the affinity tag to the 5hmC residues. In one embodiment, the chemoselective group is UDP glucose-6-azide, which undergoes a spontaneous 1,3-cycloaddition reaction with an alkyne-functionalized biotin moiety, as described in Robertson et al. (2011) Biochem. Biophys. Res. Comm. 411 (1): 40-3, U.S. Pat. No. 8,741,567 to He et al., and WO 2017/176630 to Quake et al. Addition of an alkyne-functionalized biotin-moiety thus results in covalent attachment of the biotin moiety to each 5hmC residue. An example of such a reaction is illustrated in FIG. 5B of U.S. Pat. No. 8,741,567 to He et al., incorporated by reference herein.

The affinity-tagged dsDNA template molecules can then be pulled down using an avidin or streptavidin surface, as noted above, and set aside for later processing and analysis. The supernatant remaining after removal of the affinity-tagged fragments contains dsDNA template molecules that do not contain 5hmC in their internal sequences or in appended adapters. The remaining dsDNA template molecules can continue to undergo chemical processing and ultimately be re-pooled with the pulled-down template molecules for sequencing.

The invention encompasses 5hmC-containing adapter-bound cfDNA template molecules as novel compositions of matter, where the adapters may comprise, in addition to at least one 5hmC residue, a UFI sequence such as a source UFI sequence, a molecular UFI sequence, a strand-identifier UFI sequence, or a histone modification UFI sequence, as explained earlier herein.

6. Analysis of Cell-Free RNA:

Cell-free RNA, primarily derived from apoptotic bodies and exosomes, is generally highly degraded, has a very short half-life, and is present in a cell-free sample at a very low concentration. It is therefore challenging to prepare cDNA sequencing libraries from cfRNA, insofar as the low integrity of cfRNA eliminates the possibility of using standard RNA-Seq methodology in the preparation of a cDNA library. Methods that can be adapted for use herein are those that employ ligation-free cDNA synthesis and library preparation techniques in which adapters needed for amplification are covalently attached to the cDNA without need for ligases.

In one such method, random primers are used to synthesize cDNA from cfRNA, preferably from rRNA-depleted RNA, as may be prepared with an RNase; see U.S. Pat. No. 9,745,570 to Sooknanan, the disclosure of which is incorporated by reference herein. 5' and 3' linker tags for amplification and barcoding (i.e., addition of a cfRNA UFI sequence to the cDNA) can be introduced using any effective terminal tagging procedure, e.g., that described in U.S. Pat. No. 8,304,183 to Sooknanan, also incorporated by reference. The process can be carried out using commercially available kits, such as the ScriptSeqTM v2 RNA-Seq Library Preparation Kit, available from Epicentre Biotechnologies (Illumina, Inc.). Additional description of the materials, reagents, and processes used in conjunction with ScriptSeq cDNA library preparation may be found in the ScriptSeqTM v2 RNA-Seq Library Preparation Guide [retrieved on Aug. 16, 2018 from support.illumina.com].

In another method of preparing a cDNA library from cfRNA without adapter ligation, first-strand cDNA synthesis of 3'-polyadenylated RNA with a dT primer that includes an adapter sequence employs a template switching technique that makes use of the terminal transferase activity of the selected reverse transcriptase. A short sequence of non-template nucleotides (e.g., CCC) extends the first strand of cDNA when the 5' end of the RNA is reached, and a template switching oligonucleotide containing a short sequence complementary to the added sequence (e.g., GGG) and a second adapter sequence that serves as a forward PCR primer hybridizes to the first strand extension and enables second strand synthesis and amplification via PCR. See U.S. Patent Publication No. 2017/0198285 A1 to Betts et al.; Zhu et al. (2001) Biotechniques 30 (4): 892-897; and "Tech Note: A SMARTer Approach to Small RNA Sequencing," web document reprint [retrieved on Aug. 16, 2018 from www-.takarabio.com/learning-centers/next-generation-sequencing/technical-notes/full-length-small-rna-libraries], the disclosures of which are incorporated herein by reference in their entireties.

In the context of the present invention, a ligase-free method such as one of the above-described techniques is used to synthesize adaptor-bound cDNA from cfRNA in a biological sample, where the adaptor(s) comprise a cfRNA UFI sequence to identify the dsDNA template molecule as cfRNA-derived cDNA. The adaptors also comprise at least one additional UFI sequence, such as a source UFI sequence, a molecular UFI sequence, a strand-identifier UFI sequence, or a histone modification UFI sequence, as explained earlier herein. The adapter-bound cDNA can then be amplified and sequenced, and information regarding the cfRNA in the biological sample can be obtained by deconvolution of sequence reads.

The cfRNA may be mRNA or an RNA that is not translated into a protein, i.e., non-coding RNAs (ncRNAs) such as tRNA; rRNA; small RNAs such as microRNAs (miRNAs), siRNAs, piRNAs, snoRNAs, snRNAs, exRNAs, and scaRNAs; and long nRNAs such as Xist and HOTAIR. The ScriptSeq method summarized earlier in this section is optimal for use in conjunction with cell-free RNA samples from which rRNA has been removed, while the Clontech SMART approach is particularly useful in conjunction with small ncRNAs.

The adaptor-bound cDNA can be amplified and sequenced at this point, or further analyses may be carried out in the context of an expanded combined workflow process. Of particular interest are hydroxymethylation and/or methylation analyses of the dsDNA, as explained in Section 8.

7. Analysis of Cell-Free RNA and Cell-Free DNA in a Combined Workflow:

In one embodiment, a combined workflow process is provided for preparing cfDNA and cfRNA in a single cell-free nucleic acid sample for simultaneous, sequencing-based identification. The initial step here, following extraction of the cell-free nucleic acid sample from a biological sample, is the ligation of selected adapters to the cfDNA. The adapters can be ligated onto the ends of cfDNA fragments in the cell-free nucleic acid sample to form adapter-ligated dsDNA template molecules. Standard ligation conditions and commercially available ligases can be used.

The adapters selected for ligation to the cfDNA fragments comprise a sample UFI sequence, and, preferably at least one additional UFI sequence such as a molecular UFI sequence and a strand-identifier UFI sequence. The adapter-ligated cfDNA is then purified along with the cfRNA using conventional nucleic acid purification techniques, to provide a cell-free admixture of cfRNA and adapter-ligated DNA template molecules.

In the next step in the combined workflow, the cfRNA is processed in the cell-free admixture still containing the adapter-ligated cfDNA, as the present method obviates the need for removal of the adapter-ligated cfDNA prior to or during cDNA synthesis. A first strand of cDNA is synthesized from the cfRNA, followed by synthesis of a second strand of cDNA complementary to the first strand, as is known in the art, to form a cDNA duplex. cDNA synthesis is carried out as described in the preceding section, so as to attach adapters to the cDNA without need for ligase. As before, the cDNA adapters comprise a source identifier UFI and and RNA indicator UFI, thereby providing adapter-bound cDNA in a cell-free admixture that also comprises the adapter-ligated DNA.

The adaptor-ligated dsDNA template molecules and the cDNA template molecules can be amplified and sequenced at this point, or further analyses may be carried out in the context of an expanded combined workflow process, including hydroxymethylation and/or methylation analyses of the dsDNA, as explained in the following section.

8. Combined Workflow with Hydroxymethylation and/or Methylation Analyses:

Epigenetic control of gene expression in cells is mediated in part by modifications to DNA nucleotides including the cytosine methylation status and the cytosine hydroxymethylation status of DNA. It has been known in the art for some time that DNA may be methylated at the 5 position of cytosine nucleotides to form 5-methylcytosine. Methylated DNA in the form of 5-methylcytosine is reported to occur at positions in the DNA sequence where a cytosine nucleotide occurs next to a guanine nucleotide. These positions are termed "CpG" for shorthand, and regions of the genome that contain a high proportion of CpG sites are often termed "CpG islands"; the majority of human gene promoter sequences are associated with such CpG islands. In active genes these CpG islands are generally hypomethylated. Methylation of gene promoter sequences is associated with stable gene inactivation.

DNA methylation patterns observed in cancer cells differ from those of healthy cells. Repetitive elements, particularly around pericentromeric areas, are reported to be hypomethylated in cancer relative to healthy cells, but promoters of specific genes have been reported to be hypermethylated in cancer. The balance of these two effects is reported to result in global DNA hypomethylation in cancer cells. Global DNA methylation has been studied in cells using immunohistochemistry (IHC) techniques as well as a number of other methods, but many of these methods are disadvantageous because they are labor-intensive and/or require large amounts of good quality extracted DNA.

Current methods for the detection of global DNA methylation involve extraction or purification of the DNA and are not suitable for rapid, high throughput, low cost, minimally-invasive diagnostic methods. Similarly, analysis of DNA for other modified or unusual bases (for example uracil, inosine, xanthine, and hypoxanthine) can only be investigated by the analysis of substantially pure or extracted DNA. Such analysis cannot be carried out directly in complex biological media such as tissue lysate, blood, plasma or serum.

As the field of epigenetics has evolved, the detection of another DNA modification, cytosine hydroxymethylated at the 5 position (5hmC), has proved to be potentially as important as the detection of 5mC. While the 5mC modification generally occurs within CpG dinucleotides, native 5hmC residues tend to appear in other locations. The occurrence of 5hmC is much less frequent than that of 5mC, at a ratio typically approximating 10:1, depending on tissue type (see Nestor et al. (2012) Genome Biology 13: R84), with 5mC representing about 1% of all DNA bases and 5hmC representing about 0.01% of all bases. The molecular function of 5hmC is just beginning to be understood, although it has been established that 5hmC is involved in a variety of processes, including transcription, DNA demethylation, and, in the case of aberrant 5hmC patterns, in tumorigenesis. See Tahiliani et al. (2009) Science 324 (5929): 930-035 (2009); Guo et al. (2011) ('e//145:423-434; Wu et al. (2011) Genes & Development 25:679-684; Ko et al. (2010) Nature 468: 839-843; and Robertson et al. (2011) Biochem. Biophys. Res. Comm. 411 (1): 40-3. It is also known that 5hmC is a stable DNA modification, formed from the catalytic oxidation of 5mC by a Ten-Eleven Translocation (TET) enzyme such as TET1.

Bisulfite sequencing does not distinguish between 5mC and 5hmC, and, therefore, other methods for individually detecting 5mC and 5hmC residues are necessary. As noted above, 5hmC appears far less often than 5mC, so that any method for detecting 5hmC needs to exhibit high efficiency, with respect to the fraction of all 5hmC residues that are identified, as well as high selectivity, meaning that substantially all residues identified as 5hmC should, in fact, be 5hmC residues. Several methods have been reported for detecting 5hmC in DNA that involve glucosylation with a T4 bacteriophage enzyme, B-glucosyltransferase (B-GT), as the enzyme selectively glucosylates 5hmC without modifying 5mC, In the context of the present invention, the combined workflow methods preferably include a sequencing-based process for detecting modified cytosine residues in cell-free DNA, i.e., 5mC, 5hmC, or both 5mC and 5hmC. If a hydroxymethylation analysis is to be carried out along with a methylation analysis, hydroxymethylation should be the initial focus, followed by methylation, as will be understood from the following description of process flow.

Assuming that a cell-free nucleic acid sample has already been extracted from a biological sample, with cfDNA having been adapter-ligated followed by cfRNA processing to provide adapter-bound cDNA (as described in Section 7), the combined workflow process continues so as to provide information as to the hydroxymethylation profile of the cfDNA. The "hydroxymethylation profile" can be hydroxymethylation density, e.g., the ratio of 5hmC residues to total cytosines, both modified and unmodified, within a nucleic acid region. Other measures of 5hmC density are also envisioned, e.g., the ratio of 5hmC residues to total nucleotides in a locus.

In addition to 5hmC density, the hydroxymethylation profile may also comprise hydroxymethylation information such as hydroxymethylation pattern, total 5hmC residues within a nucleic acid region, the location of 5hmC residues within a nucleic acid region, the relative positions of 5hmC residues within a nucleic acid region, and/or identification of a hydroxymethylated site as hemi-hydroxymethylated or fully hydroxymethylated.

One preferred method for detecting the hydroxymethylation profile of a nucleic acid is described in International Patent Publication WO 2017/176630 to Quake et al., incorporated herein by reference in its entirety. That method pertains to the detection of 5-hydroxymethylcytosine patterns in cell-free DNA within the context of a sequencing scheme. An affinity tag is appended to 5hmC residues in a sample of cell-free DNA, and the tagged DNA molecules are then enriched and sequenced, with 5hmC locations identified. An illustrative example of the method, as described in Quake et al., involves initially modifying end-blunted, adaptor-ligated double-stranded DNA fragments in the cell-free sample to covalently attach biotin, as the affinity tag, to 5hmC residues. This may be carried out by selectively glucosylating 5hmC residues with uridine diphospho (UDP) glucose functionalized at the 6-position with an azide moiety, a step that is followed by a spontaneous 1,3-cycloaddition reaction with alkyne-functionalized biotin via a "click chemistry" reaction, as described previously, in Section 5, with respect to 5hmC-containing capture sequences in adapters. The DNA fragments containing the biotinylated 5hmC residues are adapter-ligated dsDNA template molecules that can then be pulled down with streptavidin beads in an "enrichment" step.

In the present combined workflow process, a 5hmC UFI sequence is added to the termini of the pulled down adapter-ligated dsDNA template molecules, so that the after amplification, pooling, and sequencing, information regarding hydroxymethylation profile can be deduced from the sequence reads obtained. That is, the sequence reads are analyzed to provide a quantitative determination of which sequences are hydroxymethylated in the cfDNA. This may be done by, e.g., counting sequence reads or, alternatively, counting the number of original starting molecules, prior to amplification, based on their fragmentation breakpoint and/or whether they contain the same molecular UFI.

Other methods of ascertaining the hydroxymethylation profile of DNA in the cell-free nucleic sample are described in Provisional U.S. Patent Application Ser. No. 62/630,798 to Arensdorf et al. for "Methods for the Epigenetic Analysis of DNA, particularly Cell-Free DNA," filed Feb. 14, 2018, and in U.S. Patent Publication No. 2017/0298422 to Song et al., both of which are incorporated by reference herein. These references are also useful in conjunction with an embodiment of the invention in which the present combined workflow process further includes the detection of a cfDNA methylation profile in addition to the cfDNA hydroxymethylation profile.

The Arensdorf methodology, in the context of the present combined workflow process, can be implemented as follows:

Dual-Biotin Technique: After a cell-free nucleic acid sample has been extracted from a biological sample, with cfDNA having been adapter-ligated followed by cfRNA processing to provide adapter-bound cDNA (as described in Section 7), 5hmC residues in the cfDNA are selectively labeled with an affinity tag, e.g., a biotin moiety as explained earlier herein. Biotinylation can be carried out by selective functionalization of 5hmC residues via BGT-catalyzed glucosylation with uridine diphosphoglucose-6-azide followed by a click chemistry reaction to covalently attach an alkyne-functionalized biotin moiety as explained previously. An avidin or streptavidin surface (e.g., in the form of streptavidin beads) is then used to pull out all of the dsDNA template molecules biotinylated at the 5hmC locations, which are then placed in a separate container for UFI sequence attachment during amplification. The remaining dsDNA template molecules in the supernatant are fragments that either have 5mC residues or have no modifications (the latter group including cDNA generated from cfRNA). A TET protein is then used to oxidize 5mC residues in the supernatant to 5hmC; in this case, a TET mutant protein is employed to ensure that oxidation of 5mC does not proceed beyond hydroxylation. Suitable TET mutant proteins for this purpose are described in Liu et al. (2017) Nature Chem. Bio. 13:181-191, incorporated by reference herein. The BGT-catalyzed glucosylation followed by biotin functionalization is then repeated. The fragments so marked-biotinylated at each of the original 5mC locations—are pulled down with streptavidin beads. The bead-bound DNA fragments are then barcoded—with a UFI sequence than used in the first step, i.e., a 5mC UFI sequence-during amplification. Unmodified DNA fragments, i.e., fragments containing no modified cytosine residues, now remain in the supernatant. If desired, sequence-specific probes can be used to hybridize to unmethylated DNA strands. The hybridized complexes that result can be pulled out and tagged with a further UFI sequence during amplification, as before.

Pic-Borane Methodology: This is an alternative to the dual biotin technique, and also begins with biotinylation of 5hmC residues in adapter-ligated DNA fragments, followed by avidin or streptavidin pull-down. In this technique, however, the DNA containing unmodified 5mC residues remaining in the supernatant is oxidized beyond 5hmC, to 5caC and/or 5fC residues. Oxidation may be carried out enzymatically, using a catalytically active TET family enzyme. A "TET family enzyme" or a "TET enzyme" as those terms are used herein refer to a catalytically active "TET family protein" or a "TET catalytically active fragment" as defined in U.S. Pat. No. 9,115,386, the disclosure of which is incorporated by reference herein. A preferred TET enzyme in this context is TET2; see Ito et al. (2011) Science 333 (6047): 1300-1303. Oxidation may also be carried out chemically, using a chemical oxidizing agent. Examples of suitable oxidizing agent include, without limitation: a perruthenate anion in the form of an inorganic or organic perruthenate salt, including metal perruthenates such as potassium perruthenate (KRuO4), tetraalkylammonium perruthenates such as tetrapropylammonium perruthenate (TPAP) and tetrabutylammonium perruthenate (TBAP), and polymer supported perruthenate (PSP); and inorganic peroxo compounds and compositions such as peroxotungstate or a copper (II) perchlorate/TEMPO combination. It is unnecessary at this point to separate 5fC-containing fragments from 5caC-containing fragments, insofar as in the next step of the process, both 5fC residues and 5caC residues are converted to dihydrouracil (DHU).

That is, following oxidation of 5mC residues to 5fC and 5caC, an organic borane is added to reduce, deaminate, and either decarboxylate or deformylates the oxidized 5mC residues. The resulting dsDNA template molecules contain DHU in place of the original 5mC residues, and can be amplified, pooled, and sequenced, along with other dsDNA template molecules deriving from the same sample.

The organic borane may be characterized as a complex of borane and a nitrogen-containing compound selected from nitrogen heterocycles and tertiary amines. The nitrogen heterocycle may be monocyclic, bicyclic, or polycyclic, but is typically monocyclic, in the form of a 5- or 6-membered ring that contains a nitrogen heteroatom and optionally one or more additional heteroatoms selected from N, O, and S. The nitrogen heterocycle may be aromatic or alicyclic. Preferred nitrogen heterocycles herein include 2-pyrroline, 2H-pyrrole, 1H-pyrrole, pyrazolidine, imidazolidine, 2-pyrazoline, 2-imidazoline, pyrazole, imidazole, 1,2,4-triazole, 1,2,4-triazole, pyridazine, pyrimidine, pyrazine, 1,2,4-triazine, and 1,3,5-triazine, any of which may be unsubstituted or substituted with one or more non-hydrogen substituents. Typical non-hydrogen substituents are alkyl groups, particularly lower alkyl groups, such as methyl, ethyl, n-propyl, isopropyl, n-butyl, isobutyl, t-butyl, and the like. Exemplary compounds include pyridine borane, 2-methylpyridine borane (also referred to as 2-picoline borane), and 5-ethyl-2-pyridine. Further information concerning these organic boranes and reaction thereof to convert oxidized 5mC residues to DHU may be found in the Arensdorf patent application cited above, Provisional U.S. Patent Application Ser. No. 62/630,798, previously incorporated by reference herein.

Biotin Native 5m (Enrichment Method: This is an alternative to the dual biotin technique, and begins with biotinylation of 5hmC residues in adapter-ligated DNA fragments, followed by avidin or streptavidin pull-down. Here, however, instead of modifying the methylated DNA that remains in the supernatant, an anti-5mC antibody or an MBD protein is used to capture and pull down native 5mC-containing fragments. This technique is less preferred herein, insofar as it does not result in the generation of dsDNA template molecules that can be amplified, pooled, and sequenced with other dsDNA template molecules deriving from the same sample.

The barcoded, adapter-ligated dsDNA template molecules generated are thus dsDNA containing 5hmC and dsDNA containing 5mC and no 5hmC, and optionally further including dsDNA with no modified cytosine residues. These template molecules are amplified, pooled, and sequenced along with at least one of:

Histone modification-barcoded dsDNA template molecules generated by the process in Section 2;

Adapter-bound cDNA from cfRNA processing as described in Section 6; and

Protein-barcoded dsDNA template molecules generated from the same biological sample (e.g., a blood sample) by the process described in Section 2.

Sequencing the aforementioned admixture in a single run can thus provide information on nucleosomes, particularly histone modifications; cfRNA sequence; protein analyte identity and concentration; cfDNA hydroxymethylation profile; and cfDNA methylation profile.

Single-Stranded cfDNA:

The methods described above and elsewhere herein can also be adapted to be carried out in the analysis of single-stranded cfDNA, e.g., to determine methylation profile, hydroxymethylation profile, or the like. Selected UFI sequences, e.g., molecular UFI sequences, sample UFI sequences, process UFI sequences (including 5hmC UFI sequences and 5mC UFI sequences, as explained above), can be introduced onto single-stranded cfDNA using RCA primers, in the context of RCA techniques known to those in the art and/or described in the pertinent texts and literature. Alternatively, with single-stranded cfDNA, a complementary strand can be generated and the present process then carried out on the dsDNA molecules as described elsewhere herein.

Figure 3:
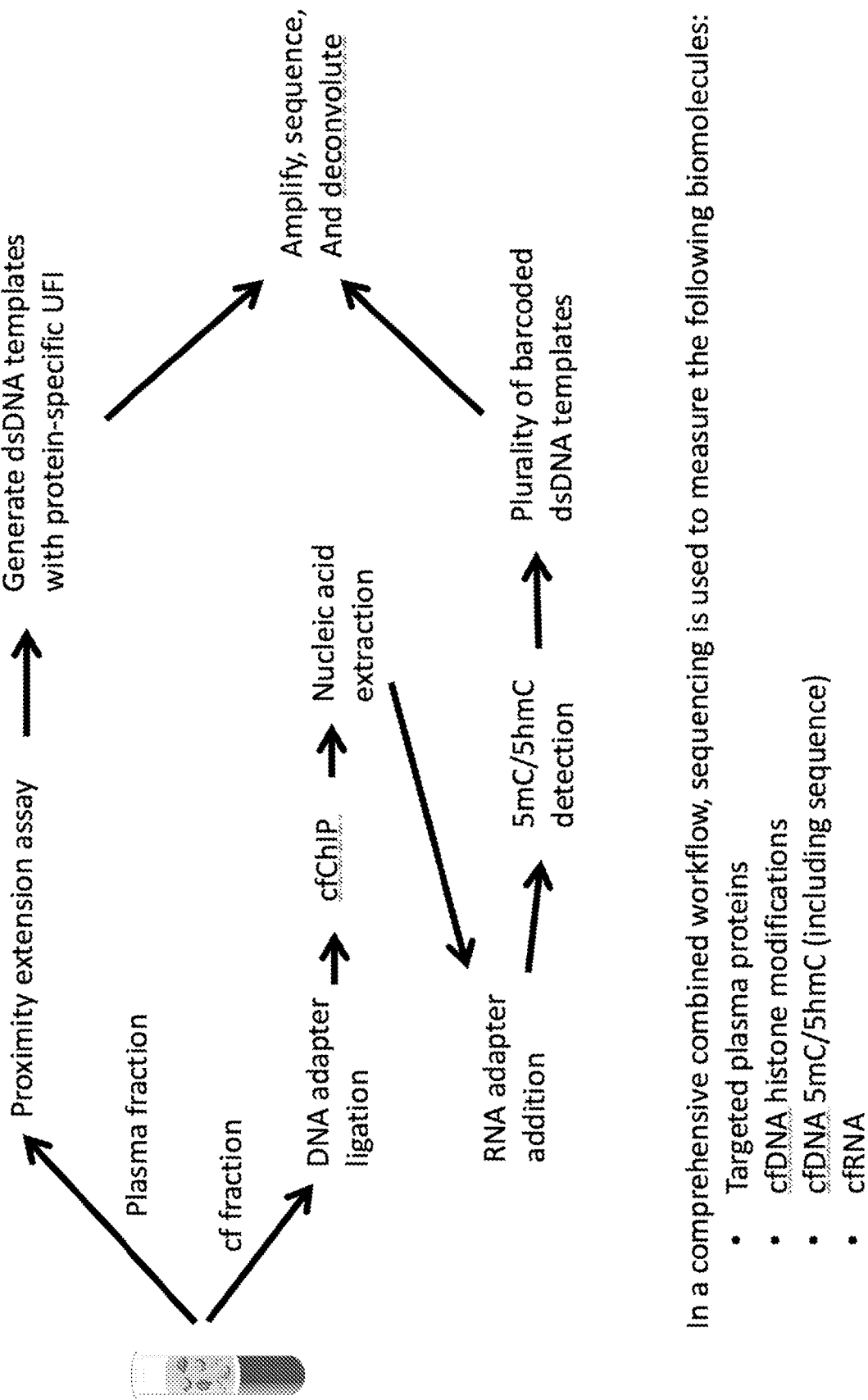
FIG. 3 schematically illustrates a comprehensive combined workflow process of the invention.

9. Comprehensive Combined Workflow Method:

The invention thus provides a combined workflow method in which multiple types of information are obtained from a single biological sample by pooling and sequencing, in a single run, amplicons of dsDNA template molecules tagged to indicate various features of the biological sample. The most comprehensive version of the process is schematically illustrated in FIG. 3 and comprises the following steps:

(1) generating protein-barcoded dsDNA template molecules from a fraction of a biological sample obtained from a subject (e.g., a blood sample) containing a plurality of protein analytes using a proximity extension assay as described in Section 2, wherein each dsDNA template molecule having a specific protein UFI sequence corresponds to the presence of that specific protein in the sample;

(2) extracting a cell-free nucleic acid sample from the remainder of the biological sample in a manner that maintains nucleosomes therein in an intact state;

(3) ligating adapters to cell-free DNA in the nucleic acid sample, where the adapters include a source identifier UFI, to identify the source or sample of the DNA, a "random" molecule identifier UFI, to identify each cfDNA fragment as an original molecule in the sample, and optionally a "strand" identifier UFI, to identify the strand of each cfDNA fragment as C or W;

(4) without separating or isolating any component of the nucleic acid sample, carrying out the proximity extension cfChIP method described in Section 4 to generate dsDNA template molecules corresponding to histone modifications identified using proximity probes, with the dsDNA template molecules so provided having histone modification UFI sequences corresponding to a specific histone modification;

(5) purifying/extracting the nucleic acid components of the nucleic acid sample using conventional means (resulting in the loss of the histone component of the nucleosomes and any other non-nucleic acid species);

(6) generating cfRNA-barcoded dsDNA template molecules in the form of cDNA duplexes bound to at least one adapter having a cfRNA UFI sequence incorporated therein, as described in Section 6;

(7) generating dsDNA template molecules corresponding to cfDNA containing 5hmC residues and, separately, cfDNA containing 5mC residues and no 5hmC, as described in Section 8;

(8) amplifying and pooling all dsDNA template molecules generated above, where amplifying can be carried out prior to or after pooling;

(9) sequencing the resulting admixture of amplicons; and

(10) deconvoluting the sequence reads to determine multiple types of information about the original biological sample, including (a) the identity and concentration of protein analytes, (b) the identity and location of histone modifications, (c) cfRNA sequence information, (d) the hydroxymethylation pattern of cfDNA; and (e) the methylation pattern of cfDNA.

Figure 4:
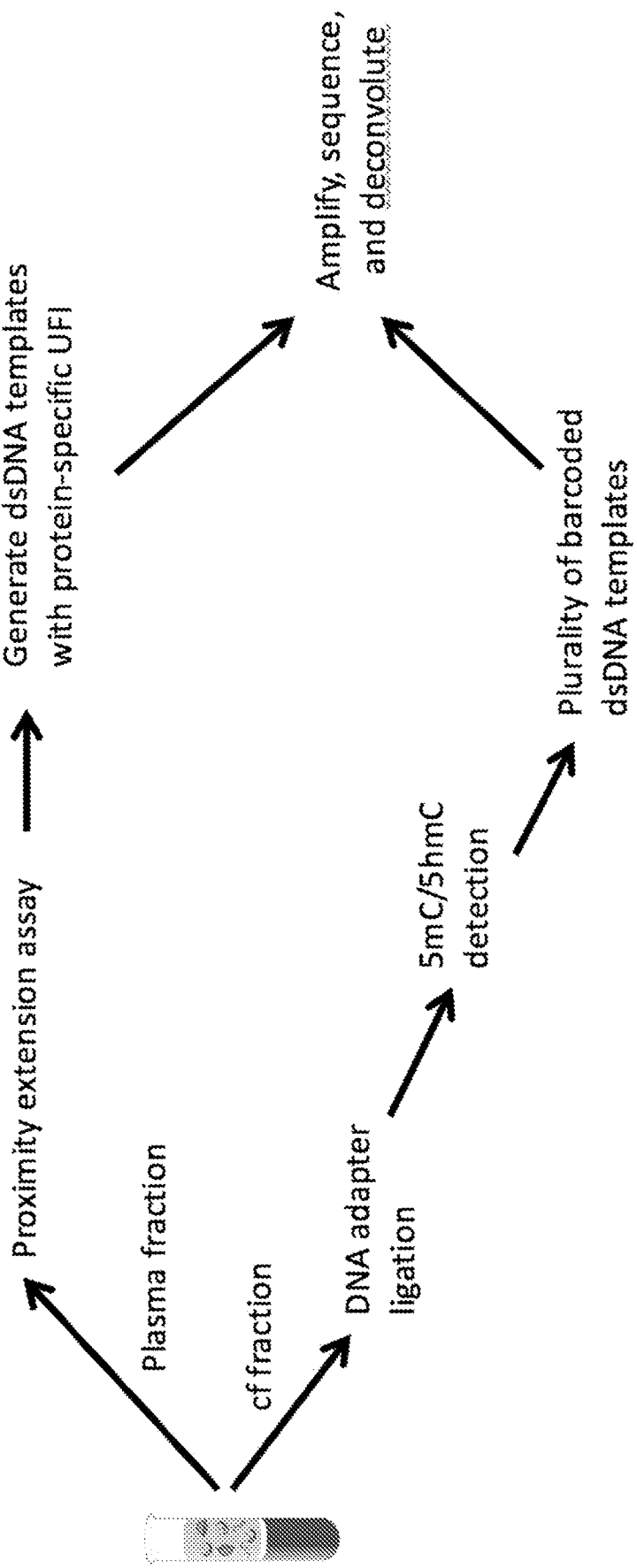
FIG. 4 schematically illustrates another combined workflow process of the invention in which cfRNA analysis is omitted.
Figure 5:
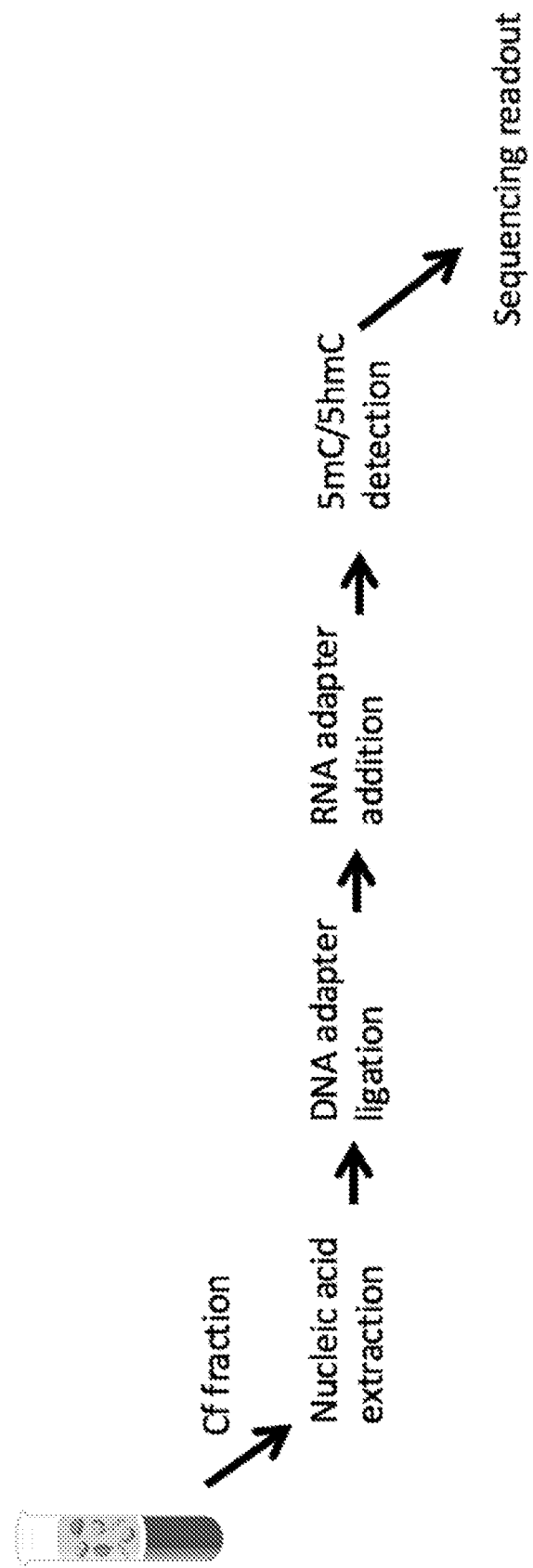
FIG. 5 schematically illustrates an additional combined workflow process of the invention in which plasma proteomics is not included.

Combined workflow methods of the invention with one or two fewer analyses are schematically illustrated in FIGS. 4 and 5.

10. Significance of UFI Sequences in the Combined Workflow Process:

It will be appreciated that a significant advantage of the invention lies in the use of a classical sequencing-based technique to determine one or more non-classical sequence features of a biological sample, where a "non-classical sequence feature" refers to a feature other than the identity and order of the primary bases (i.e., adenine, cytosine, guanine, and thymine for DNA, and adenine, cytosine, guanine, and uracil for RNA) of a nucleic acid molecule in the sample. The non-classical sequence features of interest, "encoded" in the classical sequence information obtained in the ultimate sequence reads, may be information related to the composition of a nucleic acid, such as the distribution of modified cytosine residues, e.g., 5hmC or 5mC, or it may be unrelated to the composition of a nucleic acid and pertain instead to the presence and concentration of plasma proteins in a blood sample, histone modifications observed in a cell-free nucleosome fraction of the blood sample, and the like, as discussed in detail above.

That is, the analysis involves conversion of a non-classical sequence feature of interest, such as the identity of a plasma protein, the concentration of a plasma protein, the number, location and types of histone modifications, the hydroxymethylation profile of a nucleic acid, or the methylation profile of a nucleic acid, into classical sequence data. The classical sequence data obtained includes at least one UFI, i.e., a specific nucleic acid sequence in the range of about 4 to about 36 base pairs in length, where the UFI is incorporated within a dsDNA template molecule and relates to a specific feature of the biological sample, i.e., a non-classical sequence feature of interest, as explained above.

Accordingly, in a further embodiment, the invention provides a sequencing-based method for determining a non-classical sequence feature of a nucleic acid template molecule, comprising:

appending a unique feature identifier sequence to the nucleic acid template molecule that designates a specific non-sequence feature of the template molecule;

amplifying the nucleic acid template molecule and the appended identifier sequence to give a plurality of amplicons each including the appended identifier sequence; and sequencing the amplicons and determining the non-sequence feature from the sequence reads obtained.

Normally, the nucleic acid template molecule is contained within a composition that comprises a plurality of different nucleic acid template molecules, and at least one identifier sequence designating a specific non-classical sequence feature of each template molecule is appended thereto. The non-classical sequence feature may comprise an aspect of a protein with which the nucleic acid template molecule was associated at some point, e.g., a histone. The non-classical sequence feature may also be the presence or concentration of a particular protein in the biological sample, with conversion of that to feature to a classical sequence carried out using the proximity extension assay described in Section 2. Other non-classical sequence features of interest include, by way of example, cfDNA hydroxymethylation profile and cfDNA methylation profile.

11. Truncated Adapters:

The invention additionally pertains to truncated sequencing adapters and their use in the amplification and sequencing of dsDNA template molecules. The truncated adapters, used in conjunction with certain primer constructs, are useful in adding an identifier barcode to a dsDNA template molecule during PCR amplification. The truncated sequencing adapters are in the form of a Y-construct having a double-stranded segment comprising in the range of 2 base pairs to 50 base pairs and two single-stranded segments each comprising in the range of 2 bases to 25 bases. Typically, the double-stranded segment comprises in the range of 5 base pairs to 35 base pairs and the two single-stranded segments each comprise in the range of about 5 bases to 25 bases, e.g., in the range of 5 base pairs to 25 base pairs and in the range of about 5 bases to 20 bases, respectively.

In a method for adding an identifier barcode to a dsDNA template molecule, the truncated sequencing adapters are first ligated to an end-blunted, A-tailed dsDNA template molecule using conventional means. The adapter-ligated dsDNA template molecules so provided are then amplified in a PCR process using at least one barcoded primer, wherein the barcoded primer comprises: (i) a first region that is not complementary to any sequence in the adapter and comprises one or more identifier barcodes; and (ii) a second region that is sufficiently complementary to a single-stranded segment of the adapter to hybridize thereto, such that extension of the barcoded primer in the presence of a polymerase results in a double-stranded complex of the second region of the primer and the single-stranded segment of the adapter, with the first region that comprises the identifier barcode extending beyond the end of the double-stranded complex as a single-stranded oligonucleotide tail.

The use of truncated adapters is exemplified in the experimental section herein. While the ratio of adapters to DNA template molecules can be varied, the ratio is generally in the range of about 1:5 to about 250:1 (w/w), e.g., 5:1 to 200:1, 10:1 to 150:1, or 20:1 to 100:1.

The invention also provides a kit for amplifying and sequencing a dsDNA template molecule, comprising:
(a) a sequencing adapter in the form of a Y-construct having a double-stranded segment comprising in the range of 2 base pairs to 50 base pairs and two single-stranded segments each comprising in the range of 2 bases to 25 bases;
(b) a barcoded primer comprising (i) a first region that is not complementary to any sequence in the adapter and comprises an identifier barcode; and (ii) a second region that is sufficiently complementary to a single-stranded segment of the adapter to hybridize thereto; and
(c) a polymerase.

Figure 7:
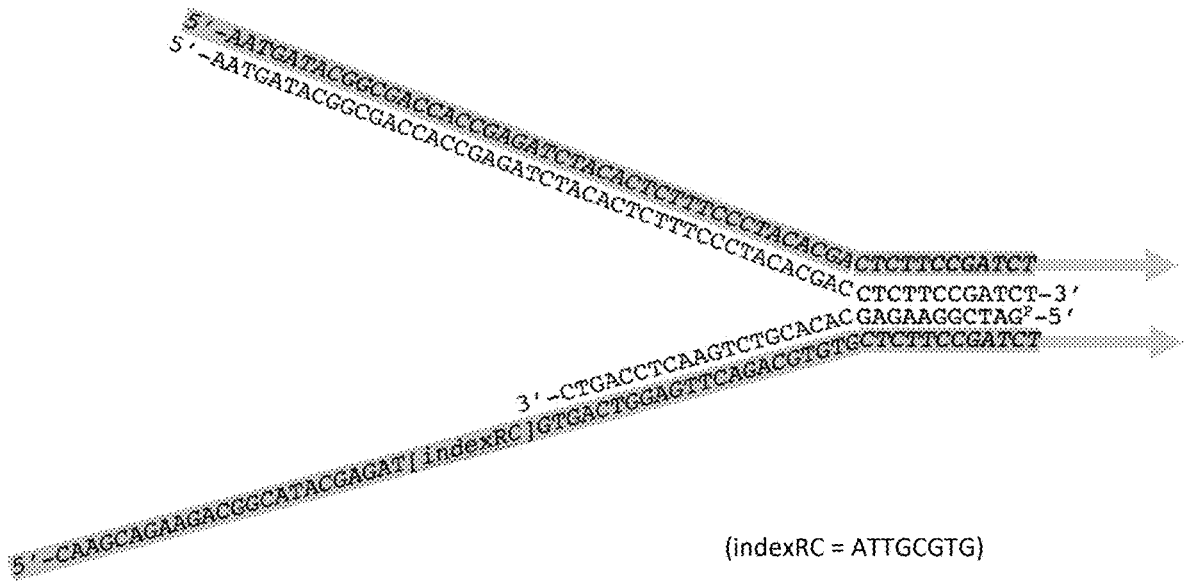
FIG. 7 illustrates a corresponding construct using a truncated adapter of the invention in combination with a barcoded primer.
Figure 8:
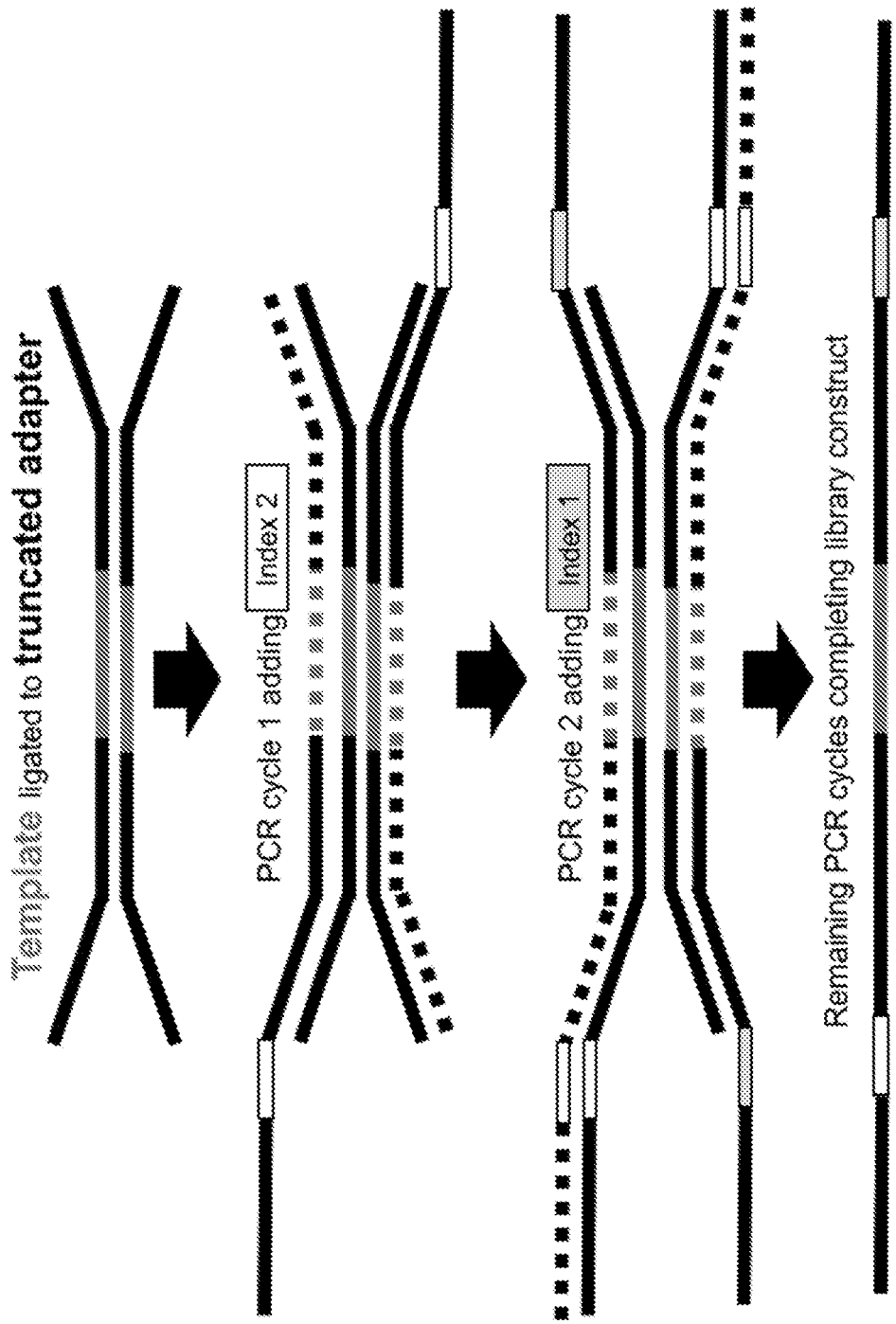
FIG. 8 schematically illustrates the use of indexed primers and truncated adapters in a PCR process.

Methods for using the truncated adapters are described in detail in the Examples herein. A representative truncated adapter is shown in FIG. 7, and may be compared with the standard prior art adapter shown in FIG. 6. Use of indexed primers and truncated adapters in a PCR process is schematically illustrated in FIG. 8.

The truncated adapter approach may be combined with any method of the invention described herein that involves ligation of DNA adapters to a dsDNA template molecule prior to amplification and sequencing.

12. Implementation with Other Methodologies:

Significantly, the methods of the invention as described in detail herein can be combined with conventional techniques that involve sequencing of a biological sample. For example, the present methods can be combined with conventional (or hereafter discovered or developed) liquid biopsy methodologies that involve sequence-based enrichment, e.g., when specific genes or "hot spots" are selectively captured (i.e., using hybrid capture) and/or selectively amplified (e.g., using multiplex PCR amplicons or multiple RCA primers). A sequence-based enrichment step, or multiple sequence-based enrichment steps, e.g., in the context of targeted sequencing, can be carried out in conjunction with any of the present methods, by separating out one or more groups of barcoded template molecules or amplification products thereof on the basis of sequence, analyzing that group, and optionally recombining, or pooling, that group with other nucleic acid fractions, prior to a combined sequencing step.

That is, the present methods and aspects thereof can be combined with non-shotgun sequencing techniques, in the analysis of a more discrete number of targeted loci, using, for instance, multiplex PCR and arrays (where a hybridization probe incorporates a process barcode and/or other UFI sequence, allowing discrimination of the marks in specific loci without direct sequencing). Examples of targeted sequencing approaches with which the present methods or aspects thereof can be combined include those described in So et al. (2018) Genomic Medicine 3:2; Gong et al., cited supra; Stahlberg et al. (2016) Nuc Acids Res 44 (11; e105) 1-7; Mamanova et al. (2010) Nature Methods 7 (2): 111-118; and others. The aforementioned publications are incorporated by reference herein.

Experimental:

The current 5hmC enrichment and whole genome sequencing (WGS) workflows are fully parallelized. In Examples 1-3, an alternative sequencing adapter construct is evaluated which permits a single template ligation reaction that can be aliquoted to 5hmC enrichment or WGS and indexed by sample only upon PCR amplification. The alternative adapters are "truncated" adapters (with single-stranded tails in the range of about 6 bases to about 30 bases in length), which are paired with modified indexed PCR sequences. Example 1 describes the preparation of custom adapters, including the design of adapter sequences and generation of adapter constructs; Example 2 describes optimization of library preparation with the adaptors prepared in Example 1; and Example 3 provides validation of at least equivalent 5hmC enrichment performance with the custom adapters, relative to enrichment performance seen with standard, commercially available "Y" adapters.

Figure 6:
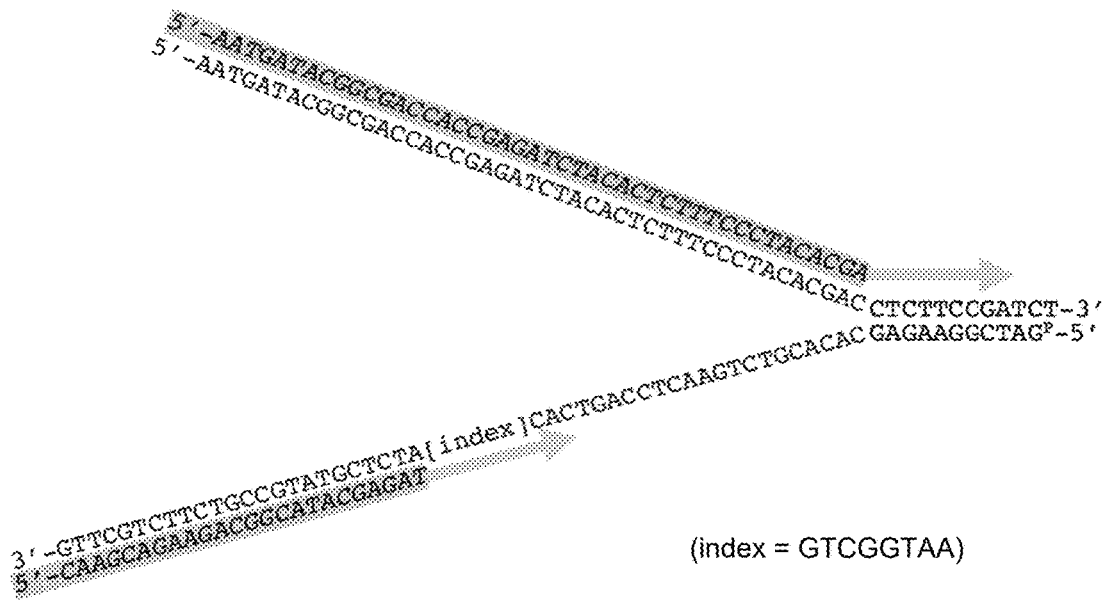
FIG. 6 illustrates a prior art template/adapter/primer construct used in adding an identifier sequence ("[index]" in the figure.

FIG. 6 (prior art) illustrates a standard adapter configuration for the Illumina Y-adapter construct; as may be seen in the figure, the sample index barcode (indicated as [index]) is contained within the Y adapter. FIG. 7 illustrates the truncated adapter configuration of the invention, with the sample index barcode (indicated as [indexRC]) within an amplification primer. Amplification primers are highlighted in both figures. The creation of an indexed library using truncated adapters and indexed primers according according to the invention are schematically illustrated in FIG. 8.

Protocol for 5hmC enrichment, library generation, and high-throughput sequencing:

Plasma was isolated from whole blood specimens obtained by routine venous phlebotomy at the time of subject enrollment. Whole blood was collected in Cell-Free DNA BCT® tubes according to the manufacturer's protocol (Streck, La Vista, NE) (www.streck.com/collection/cellfree-dna-bct/). Tubes were maintained at 15° C. to 25° C. with plasma separation performed within 24 h of phlebotomy by centrifugation of whole blood at 1600× g for 10 min at RT, followed by transfer of the plasma layer to a new tube for centrifugation at 16,000×g for 10 min. Plasma was aliquoted for subsequent cfDNA isolation or storage at −80° C.

Four ml plasma volumes were lysed for 30 minutes prior to collection of nucleic acids; all cfDNA eluates were collected in a volume of 60 µl buffer. cfDNA was isolated using the QIAamp® Circulating Nucleic Acid Kit (Qiagen, Germantown MD) following the manufacturer's protocol. Whole blood genomic DNA was extracted using the DNA Mini Kit (Qiagen®) and fragmented using dsDNA Fragmentase (NEB). DNA was quantified by Bioanalyzer® dsDNA High Sensitivity assay (Agilent Technologies Inc, Santa Clara, CA) and Qubit® dsDNA High Sensitivity Assay (Thermo Fisher Scientific, Waltham, MA).

Spike-in amplicon preparation: To generate a spiked—in control, lambda DNA was PCR amplified by Taq DNA Polymerase (NEB) and purified by AMPure® XP beads (Beckman Coulter) in nonoverlapping ~180 bp amplicons, with a cocktail of dATP/dGTP/dTTP and one of the following: dCTP, dmCTP or 10% dhmCTP (Zymo)/90% dCTP. Primer sequences are as follows: dCTP FW-5'-CGTTTCCGTTCTTCTTCGTC-3' (SEQ ID NO: 2), RV-5'-TACTCGCACCGAAAATGTCA-3' (SEQ ID NO: 3); dmCTP FW-5'-GTGGCGGGTTATGATGAACT-3' (SEQ ID NO: 4), RV-5'-CATAAAATGCGGGGATTCAC-3' (SEQ ID NO: 5); 10% dhmCTP/90% dCTP FW-5'-TGAAAACGAAAGGGGATACG-3', RV-5'-GTCCAGCTGGGAGTCGATAC-3' (SEQ ID NO: 6).

5-Hydroxymethylcytosine assay enrichment: Sequencing library preparation and 5hmC enrichment was performed as described previously (Song et al. (2017) Cell Research 27:1231-1242), incorporated by reference herein. cfDNA was normalized to 10 ng total input for each assay and ligated to sequencing adapters. 5hmC bases were biotinylated via a two-step chemistry and subsequently enriched by binding to Dynabeads® M270 Streptavidin (Thermo Fisher Scientific, Waltham, MA). All libraries were quantified by Bioanalyzer dsDNA High Sensitivity assay (Agilent Technologies Inc, Santa Clara, CA) and Qubit dsDNA High Sensitivity Assay (Thermo Fisher Scientific, Waltham, MA) and normalized in preparation for sequencing.

DNA sequencing and alignment: DNA sequencing was performed according to manufacturer's recommendations with 75 base-pair, paired-end sequencing using a NextSeq®550 instrument with version 2 reagent chemistry (Illumina, San Diego, CA). Twenty-four libraries were sequenced per flowcell and raw data processing and demultiplexing was performed using the Illumina BaseSpace® Sequence Hub to generate sample-specific FASTQ output. Sequencing reads were aligned to the hg19 reference genome using BWA-MEM with default parameters (Li & Durbin (2010), "Fast and accurate long-read alignment with Burrows-Wheeler transform," Bioinformatics 26:589-595).

Peak Detection: BWA-MEM read alignments were employed to identify regions or peaks of dense read accumulation that mark the location of a hydroxymethylated cytosine residue in a CpG content. Prior to identified peaks BAM files containing the locations of aligned reads were filtered for poorly mapped (MAPQ <30) and not properly paired reads. 5hmC peak calling was carried out using MACS2 (github.com/taoliu/MACS) with a p-value cut off=1.00e-5. Identified 5hmC peaks residing in "blacklist regions" as defined elsewhere (sites.google.com/site/anshulkundaje/projects/blacklists) and read date on chromosomes X, Y and mitochondrial genome were also removed.

Computation of genomic feature enrichment overlap 5hmC peaks were performed using the HOMER software (http://homer.ucsd.edu/homer/) with default parameters.

EXAMPLE 1

Design of adapter sequences and generation of adapter constructs:

The custom oligonucleotides in Table 1 (obtained from IDT, Integrated DNA Technologies, Coralville, IA) included three subsets: (1) truncated adapter oligonucleotides for hybridization and generation of adapter constructs; (2) indexing PCR oligonucleotides for amplification of adapter ligated products and incorporation of sample indexing; and (3) universal PCR oligonucleotides for re-amplification of libraries containing any index motif. For initial testing, 24 unique indexes were created.

Indexes were derived from a set of commercially available indexes and detected as the reverse complement of the sequence in the indexed PCR oligonucleotide primer (Index1_primer=CAAGCAGAAGACGGC
ATAACGTGTGCTCTTCCGATC*T (SEQ ID NO: 7) IndexX_primer=CAAGCAGAAGACGGCATACG
AGATAGGTCACTGTGACTGGA
GTTCAGACGTGTGCTCTTCCGATC*T (SEQ ID NO: 8); additional indexed primers were prepared using the same methodology).

TABLE 1

| Sequence Name | Function | Sequence |
| --- | --- | --- |
| P5_truncated | Adapter | ACACTCTTTCCCTACACGACGCTC TTCCGATC*T (SEQ ID NO: 9) |
| P7_truncated | Adapter | /5Phos/GATCGGAAGAGCACACG TCTGAACTCCAGTC (SEQ ID NO: 10) |
| P5_universal | Universal PCR | AATGATACGGCGACCACCGAGATC TACACTCTTTCCCTACACGA (SEQ ID NO: 11) |
| P7_universal | Universal PCR | CAAGCAGAAGACGGCATACGAGAT (SEQ ID NO: 12) |
| Universal primer | Indexing PCR | AATGATACGGCGACCACCGAGATC TACACTCTTTCCCTACACGACGCT CTTCCGATC*T (SEQ ID NO: 13) |
| Index1_primer | Indexing PCR | CAAGCAGAAGACGGCATACGAGAT GTCGGTAAGTGACTGGAGTTCAGA CGTGTGCTCTTCCGATC*T (SEQ ID NO: 7) |
| Additional indexed primers as desired | Indexing PCR | - |
| IndexX_primer | Indexing PCR | CAAGCAGAAGACGGCATACGAGAT ATTGCGTGGTGACTGGAGTTCAGA CGTGTGCTCTTCCGATC*T (SEQ ID NO: 14) |

Reconstituted 200 µM P5_truncated and P7_truncated adapter oligonucleotides were hybridized as follows.

A master mix of truncated adapter oligonucleotides in STE buffer was generated in a 1.5 ml Eppendorf tube and aliquoted to three 0.2 ml thin-wall PCR tubes (40 µl each).

| Component | Stock Concentration | Reaction concentration | Reaction volume |
| --- | --- | --- | --- |
| P5_truncated | 200 μM | 80 μM | 25 μl |
| P7_truncated | 200 μM | 80 μM | 25 μl |
| STE buffer | 10X | 2X | 10 μl |

Oligonucleotides were hybridized on an Eppendorf Mastercycler Pro with a heated lid (105° C. for block temperatures >40° C., otherwise ambient) under the following conditions:

| Phase | Temperature | Duration |
| --- | --- | --- |
| Denature | 95° C. | 5 minutes |
| Hybridize | 95° C.-20° C. | Ramp at −1° C. per minute |
| Hold | 4° C. | ∞ |

Hybridized adapters were pooled into a single 1.5 ml Eppendorf tube and stored at 4° C. through validation (long term storage is recommended at −20° C.). Adapters were diluted 1:250 in 1X STE buffer and evaluated on a Bioanalyzer High Sensitivity chip. A single large peak was visible in the electropherogram trace of the adapter, indicating successful hybridization.

The above procedure is generally applicable to the generation of index sequences, and can be modified in one or more ways as will be apparent to one of ordinary skill in the art.

EXAMPLE 2

Optimization of Library Preparation:

This example describes optimization of library preparation using the truncated adaptors prepared as described in Example 1.

(a) Preparation of template DNA for custom adaptor evaluation:

Template DNA is limited in practice, so for the purposes of optimization and validation of truncated adapters, fragmented genomic DNA was believed to offer the best solution for availability of significant, homogeneous DNA template. The KAPA® HyperPlus Kit (Roche) was used for this purpose; although the HyperPlus Kit typically is used for combined fragmentation and library preparation (including adapter ligation), only the fragmentation portion was used for this example.

Stock brain and spleen genomic DNA was diluted to 500 ng per 35 μl in buffer Tris-HCl (pH 8.0) solution. Two replicate preparations of each tissue were prepared for a total of 1 μg genomic DNA per tissue type. For both brain gDNA and spleen gDNA, the concentrations and reaction volume were as follows: stock concentration, 250 ng/μl; final concentration, 10.7 ng/μl; reaction volume, 1.5 μl; buffer EB, 33.5 μl.

Fragmentation buffer and enzyme were thawed on ice and added to each genomic DNA sample in 0.2 ml thin-wall PCR tubes. Concentrations and 1X reaction volume in the fragmentation reaction mix were as follows: dsDNA stock concentration, 10.7 ng/μl; dsDNA reaction concentration, 7.5 ng/μl; dsDNA 1X reaction volume, 35 μl; fragmentation buffer stock concentration, 10X; fragmentation buffer reaction concentration, 1X; fragmentation buffer 1X reaction volume, 5 μl; fragmentation enzyme stock concentration, 5X; fragmentation enzyme reaction concentration, 1X; fragmentation enzyme 1X reaction volume, 10 μl.

The genomic DNA samples were then fragmented on an Eppendorf® Mastercycler® Pro (heated lid off) under the following conditions: chill, 4° C. for 1 minute; fragment, 37° C. for 35 minutes.

Fragmented samples were removed immediately from the thermal cycler and purified using a 2X ratio AMPure XP bead protocol described below:

Warmed AMPure XP beads to room temperature for at least 30 minutes prior to purification;

Prepared an 80% ethanol solution by mixing 4 ml ultra-pure ethanol with 1 ml molecular grade water;

Transferred complete volume of each fragmented sample to a well-labeled 1.5 ml tube;

Added 100 μl AMPure XP beads to each sample and vortexed briefly to mix;

Allowed DNA to bind to beads for 10 minutes at room temperature;

Placed tubes on a magnetic rack and allowed beads to pellet for >1 minute, then removed and discarded supernatant;

With tubes still on the magnetic rack, added 500 μl 80% ethanol to each sample and incubated 30 seconds on the magnetic rack, then removed and discarded supernatant;

Allowed bead pellet to dry with sample tube uncapped for 5 minutes at room temperature;

Added 52 μl Buffer EB to each sample and pipetted up and down to completely dissolve the bead pellet;

Allowed samples to elute into solution for 5 minutes at room temperature, mixing occasionally;

Placed tubes on magnetic rack and allowed beads to pellet for >1 minute;

Carefully transferred 50 μl supernatant to well-labeled 1.5 ml tubes; Discarded remaining tubes and beads.

Figure 9:
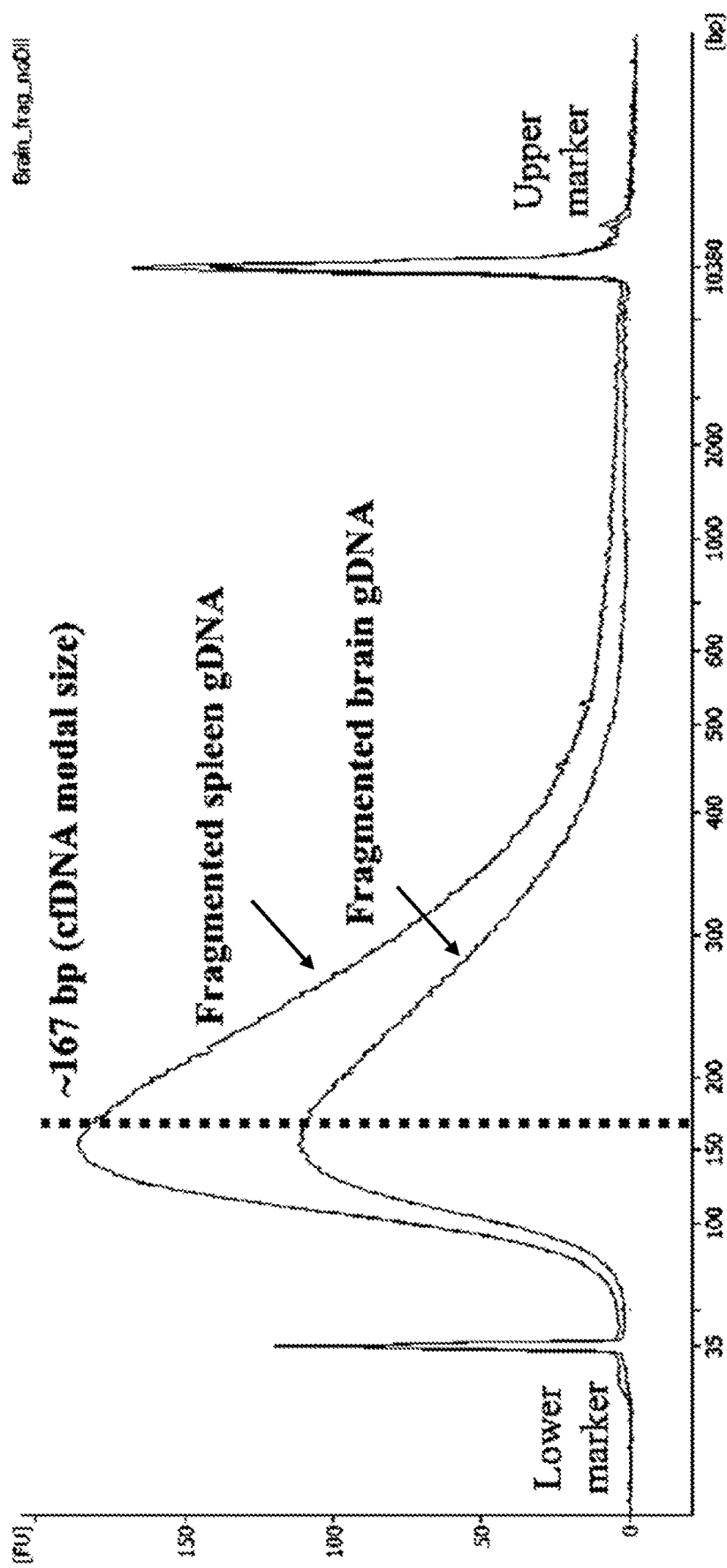
FIG. 9 shows the size distribution profiles obtained following DNA fragmentation as described in part (a) of Example 2.

The fragmented DNA was quantified using the Qubit dsDNA assay. 1 μl of each sample was evaluated. Fragmented DNA samples were evaluated for size distribution on a Bioanalyzer High Sensitivity chip; the size distribution profiles obtained are indicated in FIG. 9.

Fragmentation of genomic DNA samples was successful, with slightly higher yield in the spleen gDNA preparation than in the brain gDNA preparation. Fragment sizes observed were within the range of standard cfDNA size distributions centered on 167 bp. Yield of fragmented gDNAs was sufficient for (1) a titer of adapter input to library preparation and (2) a head-to-head evaluation of truncated adapters versus standard adapters.

(b) Adapter Titer and Ligation:

Adapters were titered into WGS library preparation for brain (10 ng input) and spleen (20 ng input) fragmented cfDNA templates over a 50-fold range spanning approximately 5-fold to approximately 500-fold adapter-to-template DNA ratios (5:1; 20:1; 50:1; 100:1; 250:1; and 500:1).

The fragmented DNA was normalized to 10 ng (brain) or 20 ng (spleen) in a 50 μl volume. An end-repair and A-tailing enzyme mix was prepared, and the fragmented genomic DNA was end-repaired and A-tailed on an Eppendorf Mastercycler Pro (heated lid on), using the following conditions: end repair at 20° C. for 30 min.; heat inactivation at 65° C. for 30 min.; and a 4° C. hold.

1.5 μl of adapter dilutions having a 9 nM, 36 nM, 91 nM, 182 nM, or 455 nM concentration were added to each end-repaired sample and mixed prior to adding ligation master mix.

A ligation master mix was prepared having the following components:

| Component | 1X volume | 10.5X volume |
|---|---|---|
| Ligation buffer | 30 µl | 315 µl |
| DNA ligase | 10 µl | 105 µl |
| Molecular Grade water | 8.5 µl | 89.25 µl |
| End-repaired DNA & adapter | 61.5 µl | Added separately |

End-repaired fragmented gDNA samples were ligated to adapter at room temperature for 30 minutes, and the ligated products were purified using a standard 1.2X ratio AMPure XP bead protocol.

(c) Amplification and Validation:

A PCR master mix was prepared containing the following components in a 10:1:1:2:6 volume ratio: 2X KAPA HiFi HotStart Ready Mix; 10 µM Universal Primer; 10 µM Index Primer (1-10); ligated DNA; and HPLC water. PCR cycling conditions were as follows: initial denature, 98° C. for 45 sec; denature, 98° C. for 15 sec; anneal, 60° C. for 30 sec. The amplified products were purified using a standard 1.2X ratio AMPure XP bead protocol, as before.

PCR amplified libraries were diluted 25X in Buffer EB and evaluated on a Bioanalyzer High Sensitivity chip and with a Qubit High Sensitivity dsDNA assay. The data are shown below.

Truncated adapter titer library concentrations:

| Adapter | Brain library | Spleen library |
|---|---|---|
| 9 nM | 1.1 ng/ul | 1.3 ng/ul |
| 36 nM | 5.1 ng/ul | 10.7 ng/ul |
| 91 nM | 6.6 ng/ul | 15.8 ng/ul |
| 182 nM | 9.4 ng/ul | 25.3 ng/ul |

Figure 10:
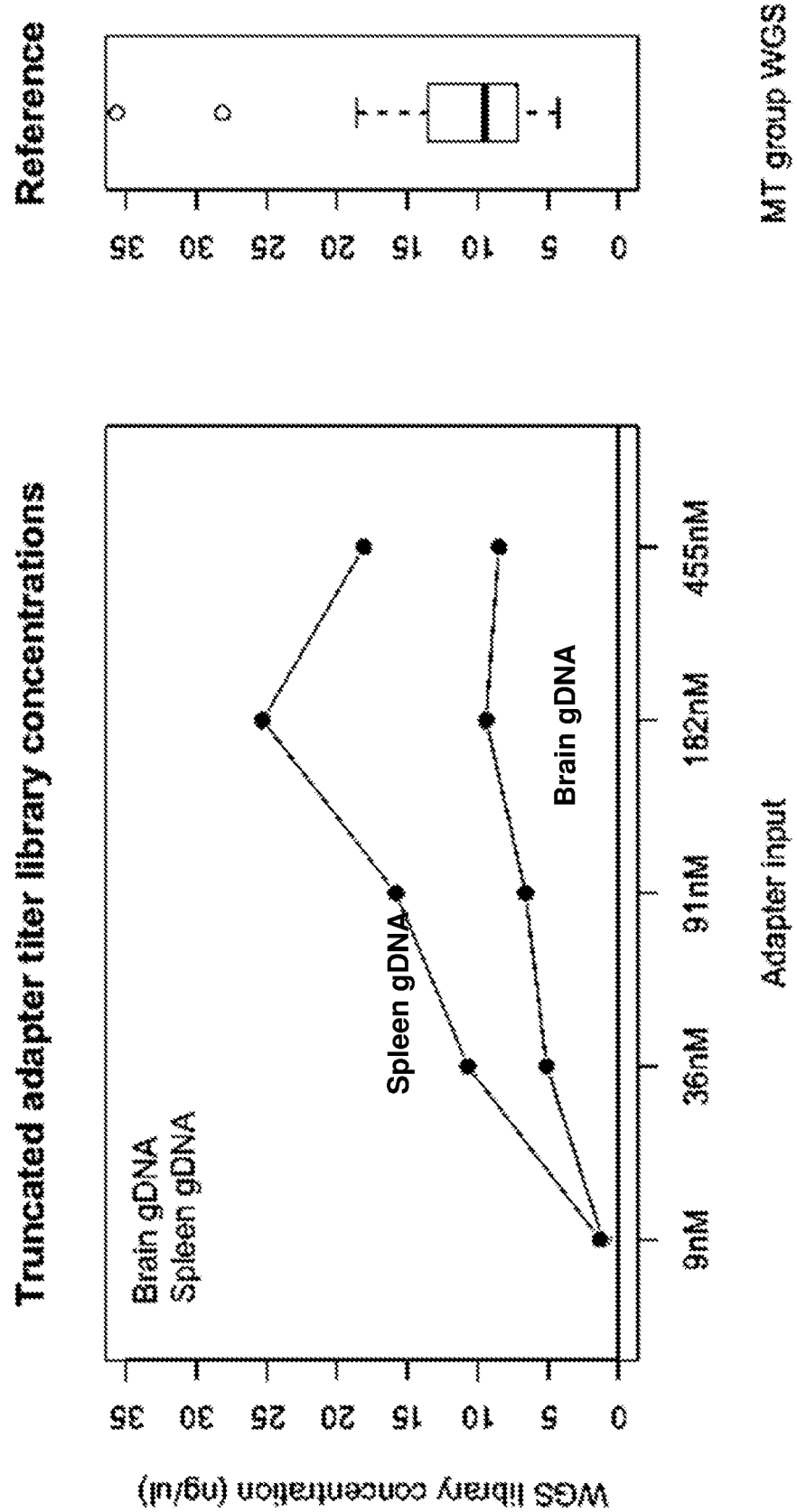
FIG. 10 is a plot of library concentration (ng/µL) versus the concentration of adapter input, along with the MT group whole genome sequencing (WGS).

WGS library concentration (ng/µL) was plotted versus the concentration of adapter input, shown in FIG. 10, along with the MT group WGS.

The data show that (1) library concentrations largely increase with adapter concentration, as expected, and (2) library concentrations are optimal in this experiment with a 182 nM adapter concentration in the ligation reaction, or a six-fold dilution of the concentrated adapter stock. As single replicates were performed on each data point, however, variance is unknown. Previously, samples processed for WGS were prepared from 10 ng cfDNA; in this experiment, 20 ng of gDNA was prepared, but only 20% was used for whole genome analysis, or the equivalent of 40% of the WGS input DNA from the existing process using a standard Y adapter. The reference values shown in FIG. 10 reflect all WGS library concentrations corrected for this 40% input adjustment. The implication of these data is that the truncated adapter ligation with 20 ng input DNA is more efficiently sampling template molecules than the existing chemistry. Based on these analyses, a six-fold dilution of the concentrated adapter stock is optimal.

EXAMPLE 3

Head-to-Head Comparison of Adapter Performance:

(a) Library Quantitation:

Based upon initial evaluation, head-to-head evaluation of truncated versus standard (Bioo Scientific®) adapters was performed. For this experiment, 20 ng fragmented brain gDNA and 20 ng spleen gDNA were each prepared in duplicate as described above; however, the remaining 80% of adapter ligated gDNA product was processed through the 5hmC enrichment protocol. As a comparison, 10 ng of each DNA type and for WGS and 5hmC enrichment was prepared using the standard protocol (Bioo adapters). All samples were sequenced on the same flowcell for comparative analysis; indexes had to be selected for Hamming distance >2 when reading through 8 bp indexing on Bioo adapters and custom sample indexes.

Size profiles of libraries produced with truncated adapters were very close to the expectation based on the size profiles of fragmented genomic DNA from brain and spleen samples;

Size profiles of Bioo adapter preparations were significantly larger than those produced from truncated adapters, likely due to differential AMPure XP bead ratios used during cleanup (note that 0.8X AMPure XP bead ratio was used for Bioo adapter preparations following both adapter ligation and PCR; unannotated changes to the existing Bioo adapter protocol use 0.8X bead ratios post-ligation and 1X bead ratios post-PCR);

Significant library is likely to be lost due to AMPure XP bead cleanup conditions in the Bioo adapter protocol. Furthermore, the fragment sizes lost are likely enriched in the 100-150 bp range and may be rich in signal.

Library quantitation data are summarized below:

| Sample | Chemistry | Library type | Conc. (ng/ul) | Average size (bp) | Conc. (nM) | Vol stock (µl) | Vol EB (µl) |
|---|---|---|---|---|---|---|---|
| Brain | Truncated | WGS | 15.7 | 408 | 58.3 | 2 | 56.3 |
| Brain | Truncated | WGS | 15.4 | 408 | 57.2 | 2 | 55.2 |
| Spleen | Truncated | WGS | 15.1 | 378 | 60.5 | 2 | 58.5 |
| Spleen | Truncated | WGS | 19.4 | 359 | 81.9 | 2 | 79.9 |
| Brain | Bioo | WGS | 17.8 | 399 | 67.6 | 2 | 65.6 |
| Brain | Bioo | WGS | 15.7 | 392 | 60.7 | 2 | 58.7 |
| Spleen | Bioo | WGS | 10.8 | 349 | 46.9 | 2 | 44.9 |
| Spleen | Bioo | WGS | 10.9 | 353 | 46.8 | 2 | 44.8 |
| Brain | Truncated | 5hmC | 13.9 | 395 | 53.3 | 2 | 51.3 |
| Brain | Truncated | 5hmC | 11.2 | 400 | 42.4 | 2 | 40.4 |
| Spleen | Truncated | 5hmC | 3.17 | 385 | 12.5 | 2 | 10.5 |
| Spleen | Truncated | 5hmC | 13.1 | 398 | 49.9 | 2 | 47.9 |
| Brain | Bioo | 5hmC | 4.92 | 453 | 16.5 | 2 | 14.5 |
| Brain | Bioo | 5hmC | 5.37 | 426 | 19.1 | 2 | 17.1 |
| Spleen | Bioo | 5hmC | 8.57 | 424 | 30.6 | 2 | 28.6 |
| Spleen | Bioo | 5hmC | 4.37 | 433 | 15.3 | 2 | 13.3 |

(b) Sequencing:

All libraries were normalized to 2 nM concentrations based on average fragment sizes. Libraries were sequencing in paired end (2×75 bp) with single 8 bp sample indexing on a NextSeq 550 instrument. High level sequence data are summarized below. Note that one sample (S8) was incorrectly tagged by index in the sample sheet due to operator error and did not correctly demultiplex in this experiment.

| Adapter | gDNA | Assay | SeqID | Clusters | AlignedCounts | AlignedRate |
|---|---|---|---|---|---|---|
| Bioo | Brain | WGS | S1 | 55477362 | 109786130 | 0.98946783 |
| Bioo | Brain | 5hmC | S2 | 37957663 | 75452231 | 0.993899848 |
| Bioo | Brain | WGS | S3 | 28511610 | 56544868 | 0.991611277 |
| Bioo | Brain | 5hmC | S4 | 49543594 | 98467860 | 0.993749666 |
| Bioo | Spleen | WGS | S5 | 53208690 | 105646342 | 0.992754586 |
| Bioo | Spleen | 5hmC | S6 | 40327676 | 80041299 | 0.992386705 |
| Bioo | Spleen | WGS | S7 | 20386446 | 40436160 | 0.991741278 |
| Bioo | Spleen | 5hmC | S8 | 4649 | 8464 | 0.910303291 |
| Truncated | Brain | 5hmC | S9 | 24302992 | 48421014 | 0.996194501 |
| Truncated | Brain | 5hmC | S10 | 21496770 | 42805445 | 0.99562504 |
| Truncated | Spleen | 5hmC | S11 | 21534375 | 42901304 | 0.996112123 |
| Truncated | Spleen | 5hmC | S12 | 24349123 | 48484669 | 0.995614277 |
| Truncated | Brain | WGS | S13 | 34219412 | 68121045 | 0.995356744 |
| Truncated | Brain | WGS | S14 | 31321563 | 62351121 | 0.995338595 |
| Truncated | Spleen | WGS | S15 | 33027297 | 65650284 | 0.993879154 |
| Truncated | Spleen | WGS | S16 | 23500398 | 46748685 | 0.994636027 |

Fragment size distributions observed in sequence data closely followed those observed on the Bioanalyzer, in which a significant size shift was observed for WGS libraries (with small fragments selected against using the Bioo protocol) but no significant difference following modification of the protocol to working AMPure XP SPRI bead conditions.

(c) Analysis:

Gene counts for each of the 16 libraries were converted to RPKM values. RPKM values were compared across treatments for WGS and for 5hmC preparations. Generally, preparations were relatively similar to one another, albeit with some noise across comparisons. Notably, 5hmC preparations from brain genomic DNA were remarkably similar to one another, particularly between replicate preparations.

A histogram of RPKM values was constructed for each library. RPKM distributions for WGS data were, as expected, narrowly distributed with a modal value approaching 1 (random distribution of reads) and a secondary distribution approaching 0.5 corresponding to X chromosome gene bodies having 50% dosage in these male samples. RPKM distributions of WGS libraries are largely congruent, as are 5hmC library RPKM distributions from brain gDNA. However, significant variability is observed in 5hmC library RKPM distributions from spleen gDNA; notably two libraries appear to approximate a WGS preparation rather than a 5hmC preparation, indicating possible background noise in the enrichment process for these libraries.

Figure 11:
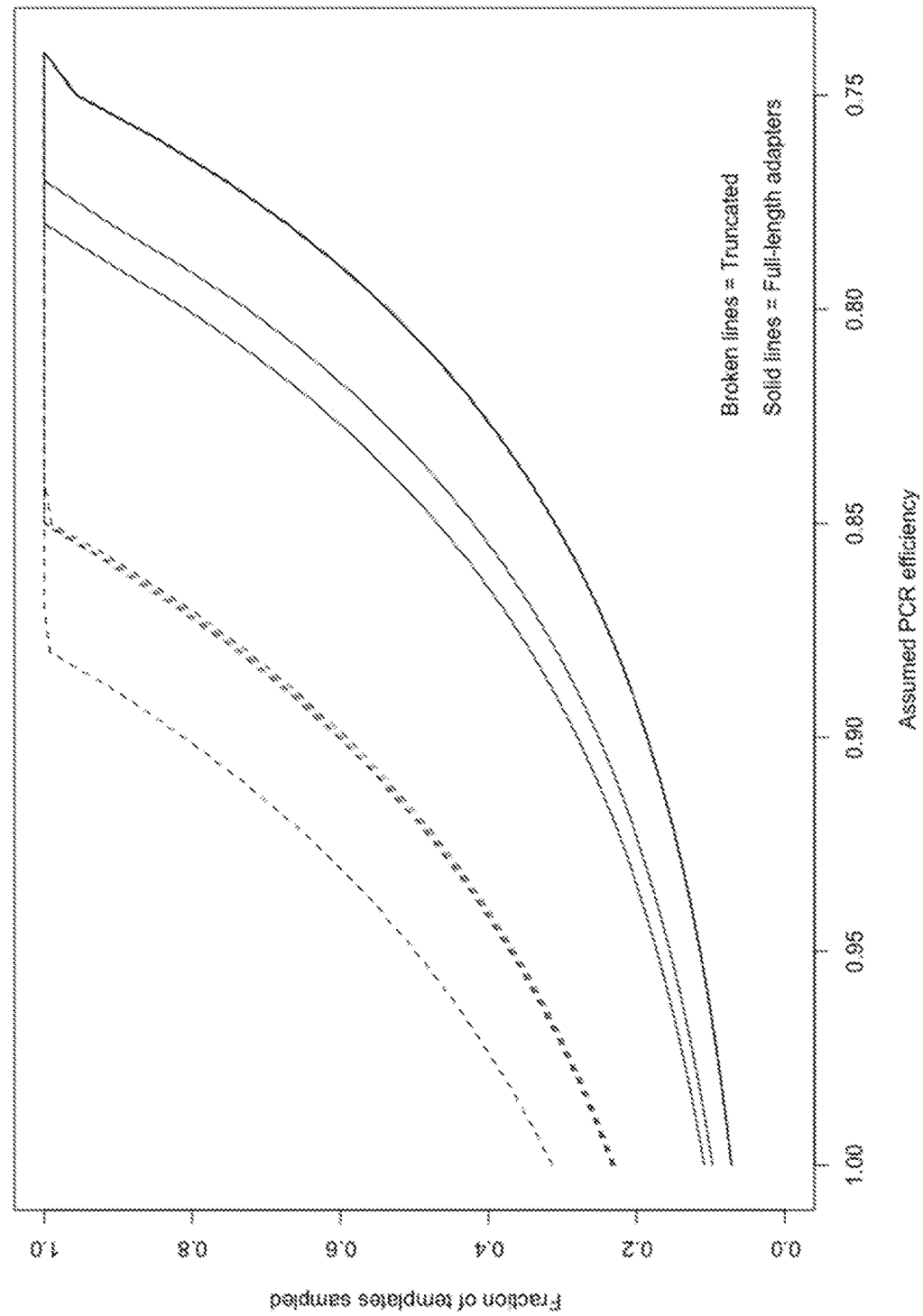
FIG. 11 illustrates the head-to-head adapter comparison results, in a plot of the fraction of templates sampled versus assumed PCR efficiency.

(d) Estimated Template Molecule Sampling Efficiency (WGS Only):

The WGS library concentrations observed in this experiment suggest that truncated adapters have approximately three-fold greater efficiency of template DNA sampling under the conditions tested (mean 2.99X, median 3.19X). Note that estimations of sampling efficiency are dependent on input template concentration, output library concentration, and PCR amplification efficiency; only the former two values are known, but a conservative (for this objective) estimation of perfect 100% amplification efficiency indicates that truncated adapters sample approximately 25% of templates and Bioo adapters sample approximately 8.5% of templates. The results of the head-to-head adapter comparison is illustrated in FIG. 11, a plot of the fraction of templates sampled versus assumed PCR efficiency.

EXAMPLE 4

Truncated Adapter Function:

The relative function of truncated adapters and indexed PCR primers can be estimated by the comparing the yield of whole genome libraries prepared from a single template with alternative adapter strategies with limited PCR cycling.

Figure 12:
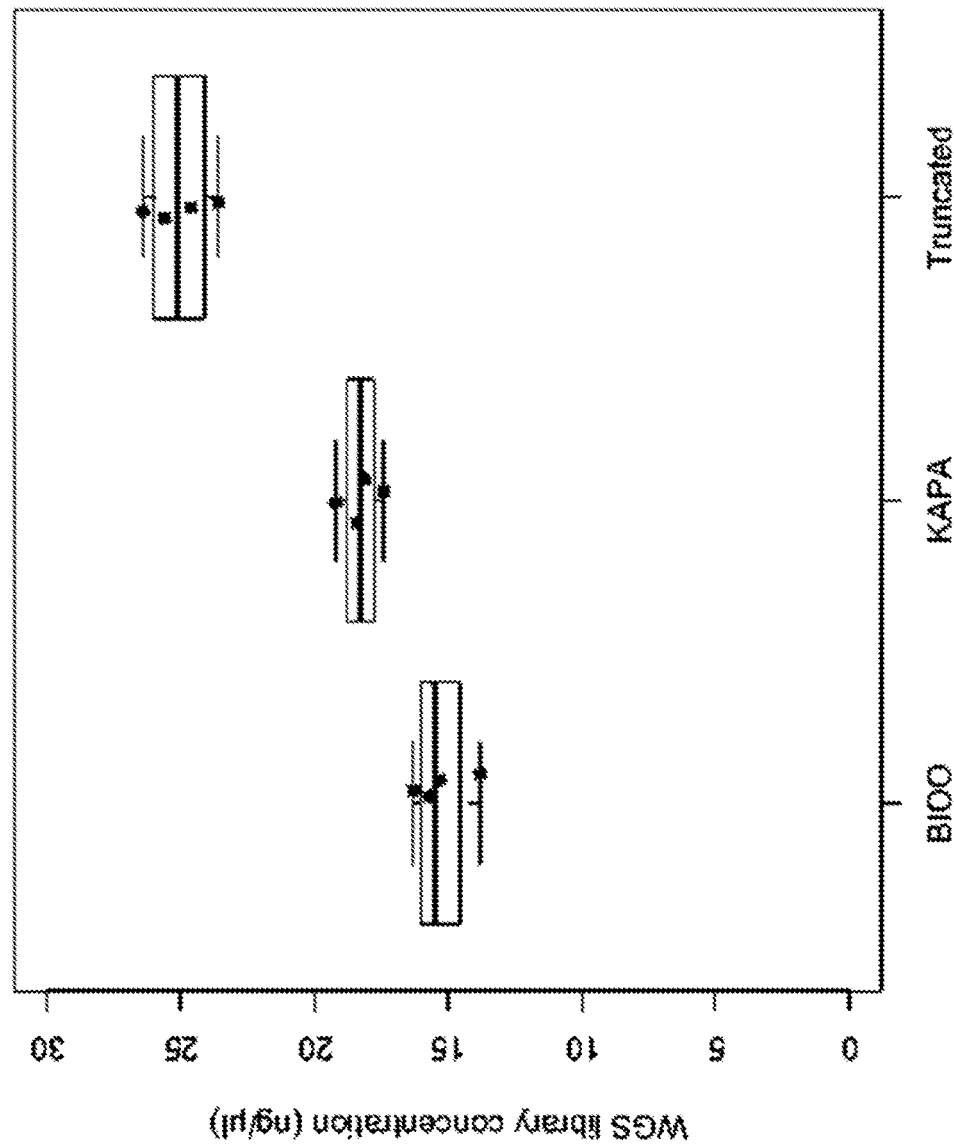
FIG. 12 provides a side-by-side comparison of truncated adapter efficiency and standard adapter efficiency, as described in Example 3.

Increased whole genome library concentrations are, in this case, assumed to reflect more efficient sampling of template molecules, which is indicative of a more efficient process globally. Compared with commercially available adapters (KAPA, BIOO), truncated adapters are approximately 1.5X-2X more efficient at sampling template DNA molecules under the conditions described above. Values observed here indicate an improvement in the efficiency with which template DNA is converted into library of >18% (truncated adapters) versus >10% (BIOO adapters). A side-by-side comparison of adapter efficiency is shown in FIG. 12.

The invention claimed is:

1. A method for preparing a cell-free nucleic acid sample to enable identification of at least one histone modification in a nucleosome contained therein using a DNA sequencing-based technique, the method comprising:
   (a) providing a cell-free nucleic acid sample containing a plurality of nucleosomes each comprising a cfDNA molecule wound around a histone core;
   (b) ligating adapters comprising terminal hybridizing regions to the ends of the cfDNA molecules, thereby providing a modified cell-free nucleic acid sample comprising adapter-ligated cfDNA molecules each wound around a histone core;
   (c) providing a proximity probe comprising, at a first terminus, a histone modification binding domain that specifically binds to a histone modification of interest; at a second terminus, a nucleic acid binding domain complementary to a terminal hybridizing region; and a non-hybridizing region therebetween comprising a nucleic acid sequence that corresponds to the histone modification of interest and thereby serves as a histone modification barcode, wherein the proximity probe is dimensioned to allow for simultaneous binding of the histone modification binding domain to the histone modification of interest and hybridization of the the nucleic acid binding domain complementary to the terminal hybridizing region;
   (d) incubating the modified cell-free nucleic acid sample with the proximity probe under conditions effective to facilitate (i) binding of the histone modification binding domain to the histone modification and (ii) hybridization of the complementary nucleic acid binding domain with the terminal hybridizing region to form a dsDNA segment with a 5' terminus originating with the cell-free DNA and a 3' terminus originating with the proximity probe and comprising the histone modification barcode; and
   (e) extending the 5' terminus of the dsDNA segment along the non-hybridizing region of the proximity probe and the histone modification barcode by adding a polymerase and a mixture of dNTPs, thereby providing a histone modification-barcoded dsDNA template molecule for amplification and sequencing.

2. The method of claim 1, wherein step (c) comprises providing a plurality of proximity probes each targeting a different histone modification.

3. The method of claim 2, further comprising amplifying the histone modification-barcoded dsDNA template molecules.

4. The method of claim 3, further comprising sequencing the amplified, histone modification-barcoded dsDNA template molecules and determining information about the type and location of histone modifications from the histone modification barcodes observed in the sequence reads generated.

5. A combined workflow process for extracting multiple types of data from a cell-free nucleic acid sample, comprising:
   (a) ligating an adapter comprising a hybridizing nucleic acid region to each terminus of nucleosome-associated DNA in a single, cell-free nucleic acid sample, thereby providing a modified cell-free nucleic acid sample comprising nucleosomes associated with adapter-ligated DNA;
   (b) providing a proximity probe comprising a histone modification binding domain at a first terminus, a nucleic acid binding domain complementary to the hybridizing nucleic acid region at an opposing second terminus, and a non-hybridizing region therebetween comprising a nucleic acid sequence selected to correspond to a specific histone modification and thereby serve as a histone modification barcode, wherein the proximity probe is dimensioned to allow for simultaneous binding of the histone modification binding domain to the histone modification and the hybridization of the complementary nucleic acid binding domain with the hybridizing nucleic acid region;
   (c) incubating the modified cell-free nucleic acid sample with the proximity probe under conditions effective to facilitate (i) binding of the histone modification binding domain to the histone modification and (ii) hybridization of the complementary nucleic acid binding domain with the hybridizing nucleic acid region to form a dsDNA segment with a 5' terminus originating with the cell-free DNA and a 3' terminus originating with the proximity probe; and
   (d) extending the 5' terminus of the segment along the non-hybridizing region of the proximity probe and the histone modification barcode by adding a polymerase and a mixture of dNTPs, thereby providing a histone modification-barcoded dsDNA template molecule for further processing and sequencing;
   (e) purifying nucleic acids in the sample to provide a purified nucleic acid composition comprising histone modification-barcoded dsDNA and DNA;
   (f) functionalizing 5hmC residues in the purified nucleic acid composition with a first affinity tag that allows selective removal of 5hmC-containing species, thereby providing tagged 5hmC-containing DNA;
   (g) removing the tagged 5hmC-containing DNA from the purified nucleic acid composition, with untagged DNA remaining, wherein the untagged DNA comprises the histone modification-barcoded dsDNA template molecule; and
   (h) appending a 5hmC process barcode to the tagged 5hmC-containing DNA, thereby providing a process-barcoded, tagged 5hmC-containing template molecule.

6. The process of claim 5, further comprising:
   (i) amplifying and sequencing the histone modification-barcoded dsDNA template molecule and the process-barcoded, tagged 5hmC-containing DNA template molecule.

7. The process of claim 6, wherein the histone modification-barcoded dsDNA template molecule and the process-barcoded, 5hmC-containing DNA template molecule are pooled prior to amplification and sequencing.

8. The process of claim 6, wherein following step (d), adapters comprising an additional barcode are ligated to the histone modification-barcoded dsDNA.

9. The process of claim 8, wherein the additional barcode comprises a source identifier sequence.

10. The process of claim 9, wherein the additional barcode further comprises a fragment identifier sequence, a strand identifier sequence, or both a fragment identifier sequence and a strand identifier sequence.

11. The process of claim 5, wherein the cell-free nucleic acid sample is obtained from a blood sample.

12. The process of claim 11, further comprising carrying out a plasma protein analysis on a fraction of the blood sample.

13. The process of claim 12, wherein plasma proteins are analyzed by generating a dsDNA template molecule comprising a protein identifier barcode corresponding to a protein analyte.

14. The process of claim 13, further comprising amplifying and sequencing the histone modification-barcoded dsDNA template molecule, the process-barcoded, 5hmC-containing DNA template molecule, and the protein-barcoded dsDNA template molecule.

15. The process of claim 14, wherein the histone modification-barcoded dsDNA template molecule, the process-barcoded, 5hmC-containing DNA template molecule, and the protein-barcoded dsDNA template molecule are pooled prior to amplification and sequencing.

16. The method of claim 5, further including:
synthesizing a first strand of cDNA from RNA in the cell-free nucleic acid sample;
synthesizing a second strand of cDNA complementary to the first strand to provide a cDNA duplex; and
covalently attaching to at least one terminus of the cDNA duplex, in the absence of a ligase, a cDNA adapter comprising a sequence that includes a source identifier barcode and an RNA indicator barcode, thereby providing a nucleic acid composition comprising adapter-bound cDNA and the histone modification-barcoded dsDNA template molecule.

17. The process of claim 16, further comprising:
amplifying and sequencing the histone modification-barcoded dsDNA template molecule, the adapter-bound cDNA, and the process-barcoded, tagged 5hmC-containing DNA template molecule.

18. The process of claim 17, wherein the histone modification-barcoded dsDNA template molecule, the process-barcoded, 5hmC-containing DNA template molecule, and the adapter-bound cDNA are pooled prior to amplification and sequencing.

* * * * *